United States Patent
Lee

(10) Patent No.: US 11,073,390 B2
(45) Date of Patent: Jul. 27, 2021

(54) LIDAR SYSTEM AND AUTONOMOUS DRIVING SYSTEM USING THE SAME

(71) Applicant: LG Electronics Inc., Seoul (KR)

(72) Inventor: Jejong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 6 days.

(21) Appl. No.: 16/590,632

(22) Filed: Oct. 2, 2019

(65) Prior Publication Data

US 2020/0033124 A1 Jan. 30, 2020

(30) Foreign Application Priority Data

Aug. 30, 2019 (KR) .................. 10-2019-0107763

(51) Int. Cl.
| | |
|---|---|
| *G01C 15/00* | (2006.01) |
| *G01S 17/02* | (2020.01) |
| *G01S 17/89* | (2020.01) |
| *G01S 7/481* | (2006.01) |
| *G01S 17/86* | (2020.01) |
| *G01S 17/32* | (2020.01) |

(52) U.S. Cl.
CPC .......... *G01C 15/002* (2013.01); *G01S 7/4811* (2013.01); *G01S 7/4817* (2013.01); *G01S 17/86* (2020.01); *G01S 17/89* (2013.01); *G01S 17/32* (2013.01)

(58) Field of Classification Search
CPC .......... G01S 17/89; G01S 17/58; G01S 17/86; G01S 17/32; G01S 17/933; G01S 17/931; G01S 7/4817; G01S 7/4811; G01S 7/003; G01S 13/931; G01S 13/582; G01S 2013/93272; G01S 13/36; G01S 13/862; G01S 13/867; G01S 13/584; G01S 13/347; G01S 13/865; G01S 2013/9323; G01S 2013/9324; G01S 2013/931; G01S 2013/93271; G01S 2013/93274; H04W 4/46; H04W 4/024; H04W 4/80; H04W 4/027; H04W 4/44; G01C 15/002
See application file for complete search history.

(56) References Cited

U.S. PATENT DOCUMENTS

| | | | |
|---|---|---|---|
| 2004/0119838 A1* | 6/2004 | Griffis ................... | G01S 7/486 348/215.1 |
| 2016/0072275 A1* | 3/2016 | Caldwell ................ | H03M 3/30 361/91.1 |

(Continued)

*Primary Examiner* — Sang H Nguyen
(74) *Attorney, Agent, or Firm* — Fish & Richardson P.C.

(57) ABSTRACT

Provided are a lidar system and an autonomous driving system using the same. The lidar system includes: a light emitter configured to include a light source generating a laser beam and a scanner moving the laser beam from the light source to scan an object with the laser beam; a receiving sensor configured to convert light reflected and received by the object into an electrical signal; and a signal processor configured to include a trans impedance amplifier amplifying an output signal of the receiving sensor, an analog to digital converter converting an output signal of the trans impedance amplifier into a digital signal, and a gain controller varying a gain of the trans impedance amplifier. According to the lidar system, an autonomous vehicle, an AI device, and an external device may be linked with an artificial intelligence module, a drone, a robot, an Augmented or Virtual Reality device, etc.

21 Claims, 21 Drawing Sheets

(56) References Cited

U.S. PATENT DOCUMENTS

| | | | |
|---|---|---|---|
| 2017/0090019 A1* | 3/2017 | Slobodyanyuk | G01S 7/4865 |
| 2017/0242108 A1* | 8/2017 | Dussan | G01S 7/487 |
| 2017/0355307 A1* | 12/2017 | Ha | B60Q 9/005 |
| 2017/0372602 A1* | 12/2017 | Gilliland | G01S 17/66 |
| 2018/0136655 A1* | 5/2018 | Kim | B60N 2/002 |
| 2018/0284240 A1* | 10/2018 | LaChapelle | G01S 17/10 |
| 2019/0011256 A1* | 1/2019 | Otsuka | G01C 3/08 |
| 2019/0049569 A1* | 2/2019 | Kim | G01S 13/282 |
| 2019/0154439 A1* | 5/2019 | Binder | G01S 15/08 |
| 2019/0154810 A1* | 5/2019 | Tanemura | G01S 7/4818 |
| 2019/0369217 A1* | 12/2019 | Policht | G01S 7/4865 |

\* cited by examiner

FIG. 10
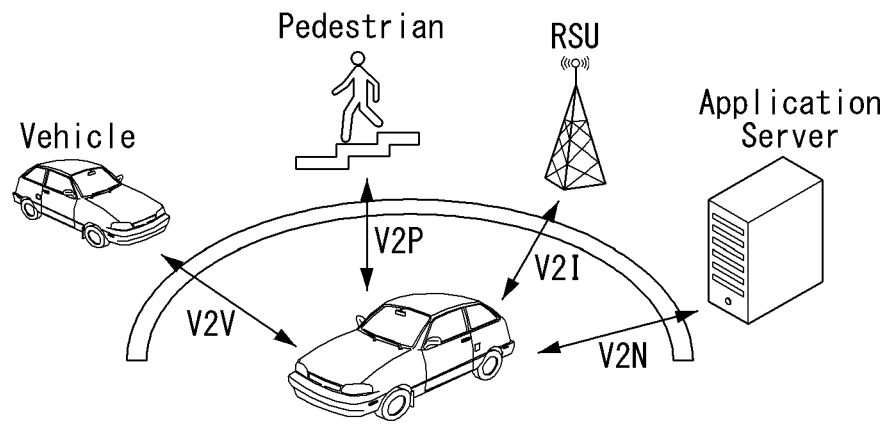
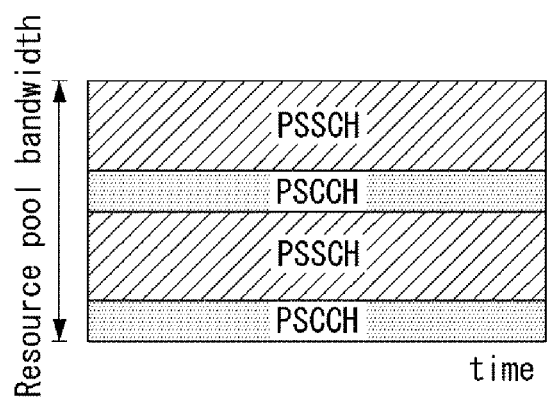
FIG. 11A
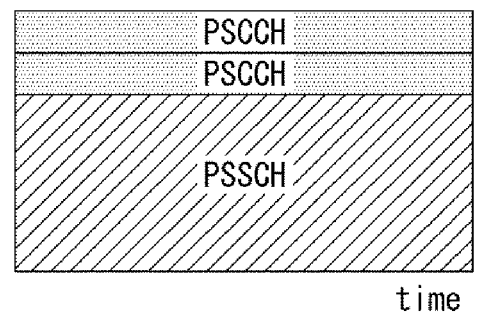
FIG. 11B

| PD1 | PD1 | PD1 | PD1 | PD1 | PD1 |
|-----|-----|-----|-----|-----|-----|
| PD1 | PD1 | PD1 | PD1 | PD1 | PD1 |
| PD1 | PD1 | PD1 | PD1 | PD1 | PD1 |
| PD1 | PD1 | PD1 | PD1 | PD1 | PD1 |
| PD1 | PD1 | PD1 | PD1 | PD1 | PD1 |
| PD2 | PD2 | PD2 | PD2 | PD2 | PD2 |
| PD2 | PD2 | PD2 | PD2 | PD2 | PD2 |

| PD1 | PD1 | PD1 | PD1 | PD1 | PD1 |
| --- | --- | --- | --- | --- | --- |
| PD1 | PD1 | PD1 | PD1 | PD1 | PD1 |
| PD1 | PD1 | PD1 | PD1 | PD1 | PD1 |
| PD1 | PD1 | PD1 | PD1 | PD1 | PD1 |
| PD2 | PD2 | PD2 | PD2 | PD2 | PD2 |
| PD2 | PD2 | PD2 | PD2 | PD2 | PD2 |
| PD2 | PD2 | PD2 | PD2 | PD2 | PD2 |

LIDAR SYSTEM AND AUTONOMOUS DRIVING SYSTEM USING THE SAME

CROSS-REFERENCE TO RELATED APPLICATION

This application claims the benefit of Korean Patent Application No. 10-2019-0107763, filed on Aug. 30, 2019, the entire contents of which is incorporated herein by reference for all purposes as if fully set forth herein.

BACKGROUND

Field of the Disclosure

The present disclosure relates to an autonomous driving system and a control method thereof and, more particularly, to a lidar system including a diffraction optical element that separates laser beams from light sources, and an autonomous driving system using the lidar system.

Related Art

Vehicles, in accordance with the prime mover that is used, can be classified into an internal combustion engine vehicle, an external combustion engine vehicle, a gas turbine vehicle, an electric vehicle or the like.

An autonomous vehicle refers to a vehicle that can be driven by itself without operation by a driver or a passenger and an autonomous driving system refers to a system that monitors and controls such an autonomous vehicle so that the autonomous vehicle can be driven by itself.

In the autonomous driving system, there is an increasing demand for technologies that provide passengers or pedestrians with safer traveling environment as well as technologies that control the vehicle to quickly travel to a destination. To this end, autonomous vehicles require various sensors to quickly and accurately detect the surrounding terrains and objects in real time.

A lidar (Light Imaging Detection and Ranging) system radiates laser light pulses to an object and analyzes light reflected by the object, thereby being able to sense the size and disposition of the object and to measure the distance from the object.

SUMMARY

The lidar system generates a laser beam with the same laser power, and detects the light reflected from the object using a receiving sensor. Such a lidar system has a limitation in long distance detection when designed around short distance detection, and conversely, has a limitation on long distance detection when designed around short distance detection.

Because of the high reflectance of light in the short distance, the lidar system may have short distance detection performance degraded due to saturation of the received signal.

The present disclosure aims to address the above-described needs and/or problems.

The present disclosure provides a lidar system capable of coping with various use cases and an autonomous driving system using the same.

The present disclosure also provides a lidar system capable of measuring a distance without saturation of a short distance signal without varying laser power and improving short distance and long distance detection capabilities, and an autonomous driving system using the same.

Aspects of the present disclosure are not limited to the above-mentioned aspects. That is, other aspects that are not mentioned may be obviously understood by those skilled in the art from the following specification.

In an aspect, a lidar system includes: a light emitter configured to include a light source generating a laser beam and a scanner moving the laser beam from the light source to scan an object with the laser beam; a receiving sensor configured to convert light reflected and received by the object into an electrical signal; and a signal processor configured to include a trans impedance amplifier amplifying an output signal of the receiving sensor, an analog to digital converter converting an output signal of the trans impedance amplifier into a digital signal, and a gain controller varying a gain of the trans impedance amplifier.

The gain controller may adjust the gain of the trans impedance amplifier depending on a detection distance of the lidar system.

In another aspect, an autonomous driving system includes an autonomous driving device for reflecting information on an object detected by the lidar system to movement control of a vehicle.

BRIEF DESCRIPTION OF THE DRAWINGS

Accompanying drawings included as a part of the detailed description for helping understand the present disclosure provide embodiments of the present disclosure and are provided to describe technical features of the present disclosure with the detailed description.

FIG. 10 is a diagram showing an example of V2X communication to which the present disclosure can be applied.

FIGS. 11A and 11B are diagrams showing a resource allocation method in sidelink in which the V2X is used.

The accompanying drawings, which are included as part of the detailed description to assist understanding of the disclosure, illustrate embodiments of the disclosure and explain the technical features of the disclosure together with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereafter, a device that requires autonomous driving information and/or 5G communication (5th generation mobile communication) that an autonomous vehicle requires are described through a paragraph A to a paragraph G.

A. Example of Block Diagram of UE and 5G Network

Figure 1:
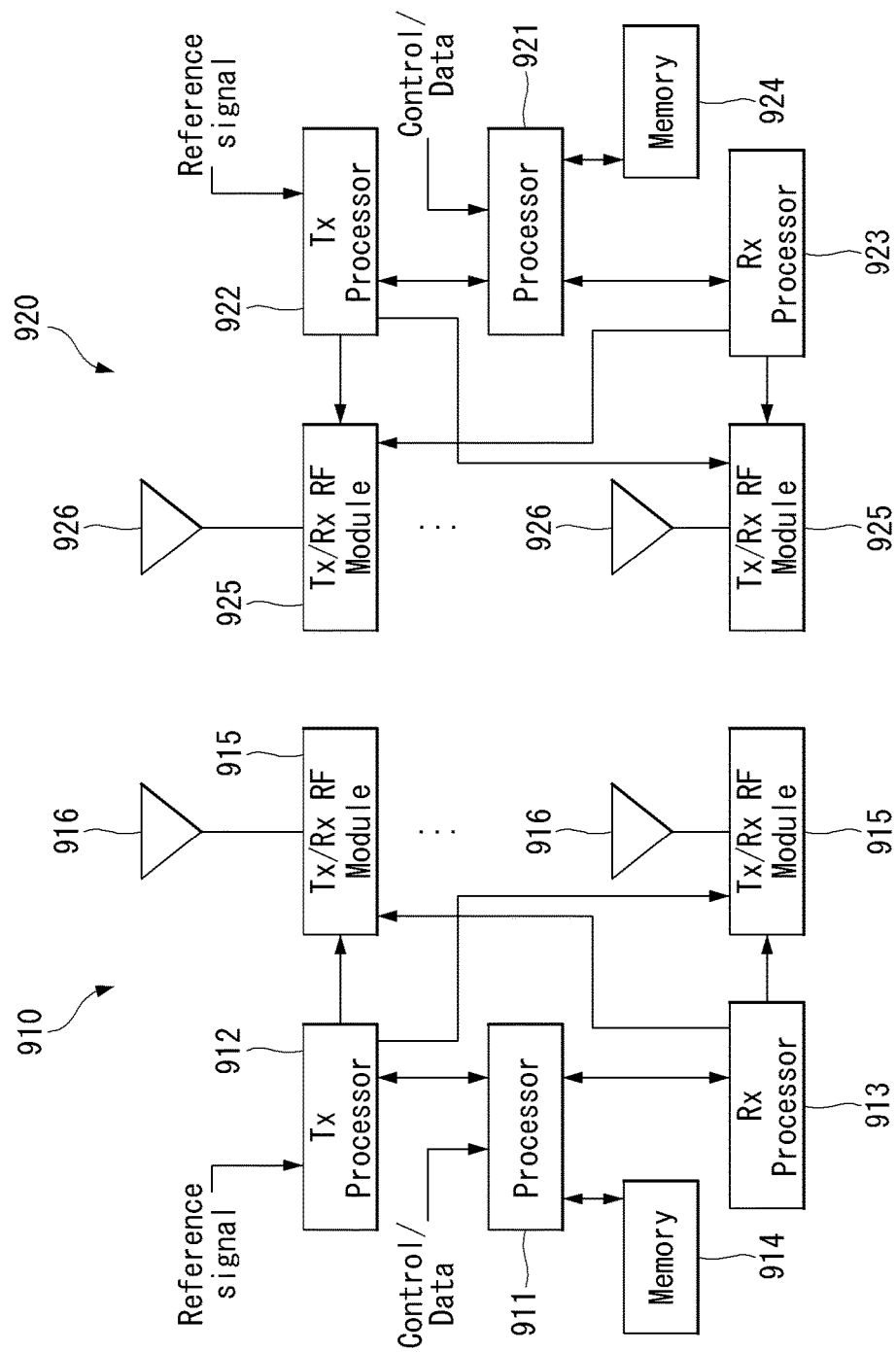
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
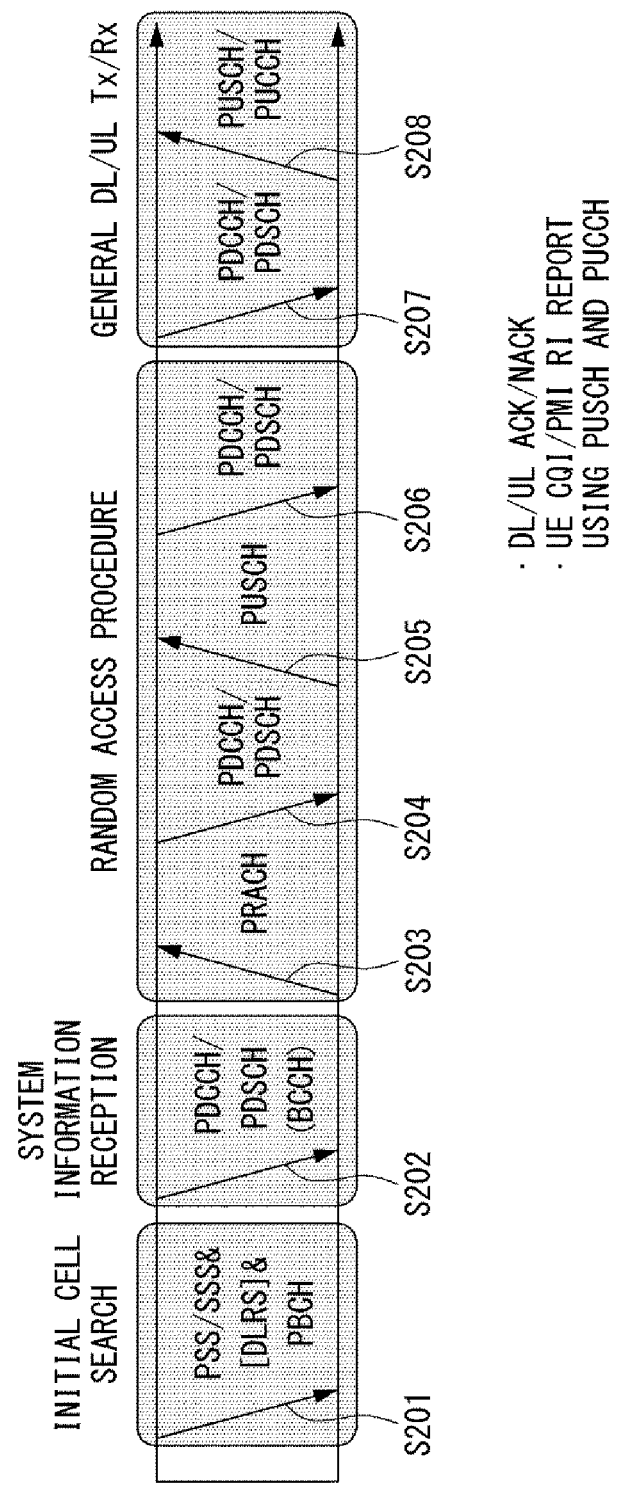
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.
Configuration of a beam report using an SSB is performed when channel state information (CSI)/beam is configured in RRC CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to "beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
    - When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
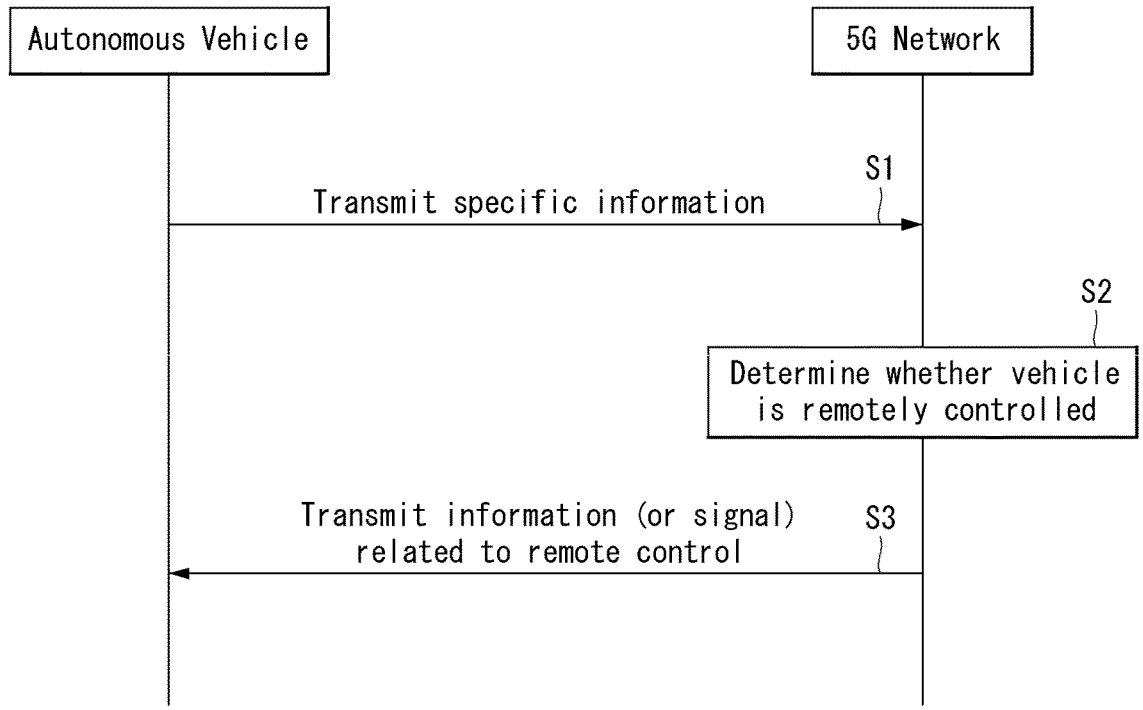
FIG. 3 shows an example of basic operations of a user equipment and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

H. Autonomous Driving Operation Between Vehicles Using 5G Communication

Figure 4:
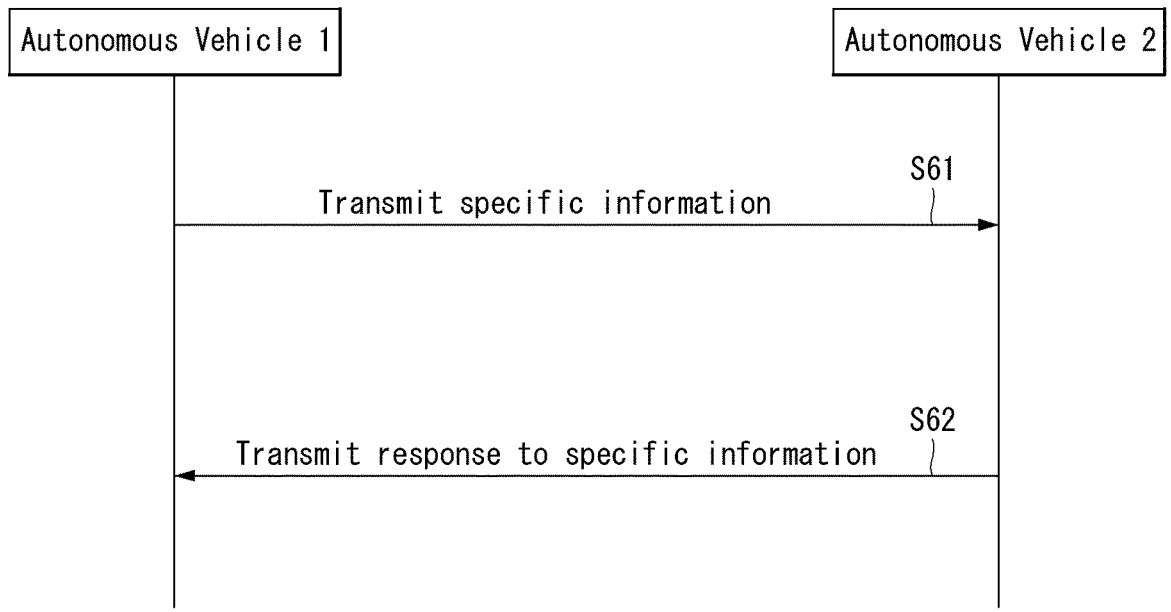
FIG. 4 shows an example of a basic operation between vehicles using 5G communication.

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network can transmit DCI format 5A to the first vehicle for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

The above-described 5G communication technology can be combined with methods proposed in the present disclosure which will be described later and applied or can complement the methods proposed in the present disclosure to make technical features of the methods concrete and clear.

Driving (1) Exterior of Vehicle

Figure 5:
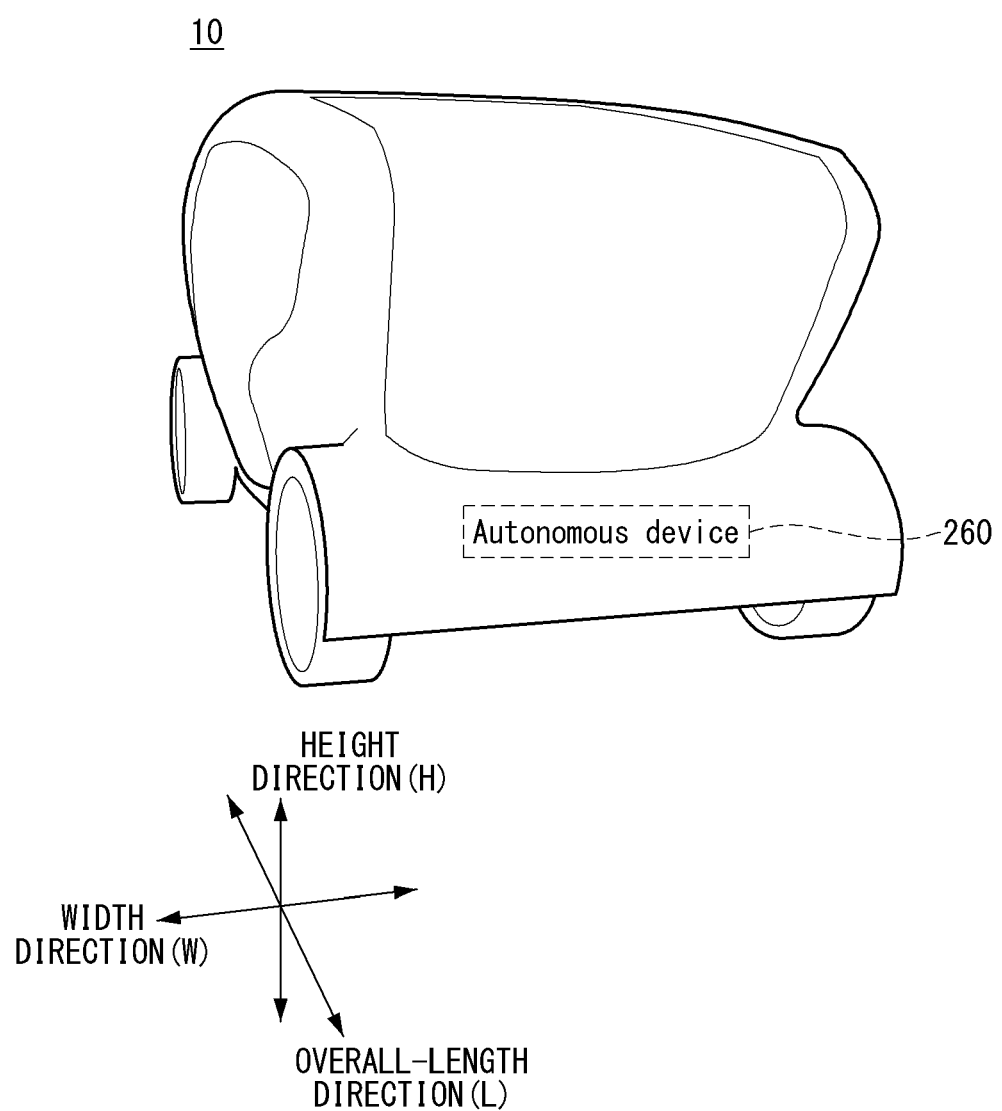
FIG. 5 is a diagram showing a vehicle according to an embodiment of the present disclosure.

FIG. 5 is a diagram showing a vehicle according to an embodiment of the present disclosure.

Referring to FIG. 5, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 6:
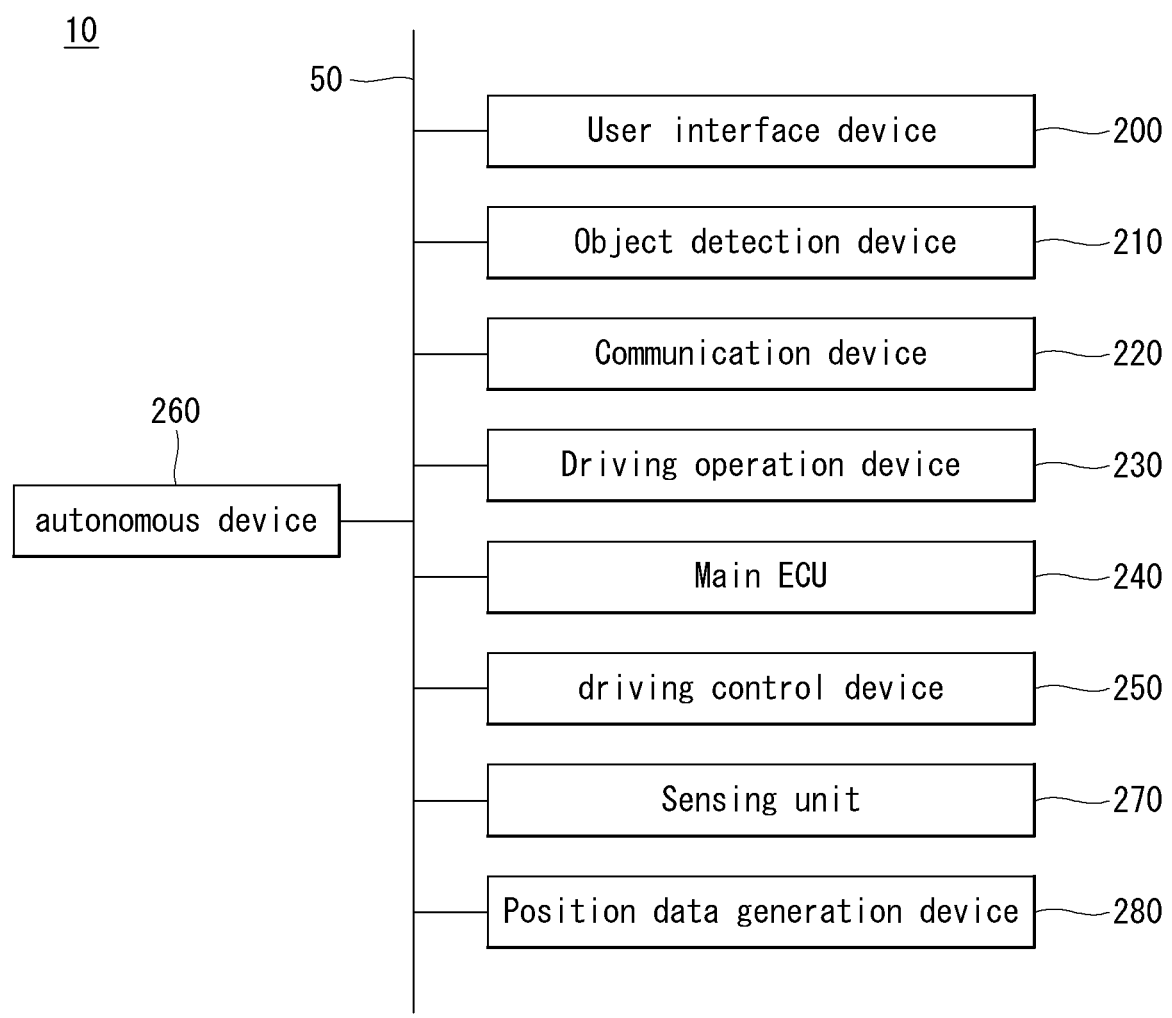
FIG. 6 is a control block diagram of the vehicle according to an embodiment of the present disclosure.

FIG. 6 is a control block diagram of the vehicle according to an embodiment of the present disclosure.

Referring to FIG. 6, the vehicle 10 may include a user interface device 200, an object detection device 210, a communication device 220, a driving operation device 230, a main ECU 240, a driving control device 250, an autonomous driving device 260, a sensing unit 270, and a position data generation device 280. The object detection device 210, the communication device 220, the driving operation device 230, the main ECU 240, the driving control device 250, the autonomous driving device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous driving device 260. For example, the driving control device 250 can control a power train, a steering device and a brake device on the basis of signals received by the autonomous driving device 260.

7) Autonomous Device

The autonomous driving device 260 can generate a route for self-driving on the basis of acquired data. The autonomous driving device 260 can generate a driving plan for traveling along the generated route. The autonomous driving device 260 can generate a signal for controlling movement of the vehicle according to the driving plan. The autonomous driving device 260 can provide the signal to the driving control device 250.

The autonomous driving device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous driving device 260 can perform switching from a self-driving mode to a manual driving mode or switching from the manual driving mode to the self-driving mode. For example, the autonomous driving device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

Figure 7:
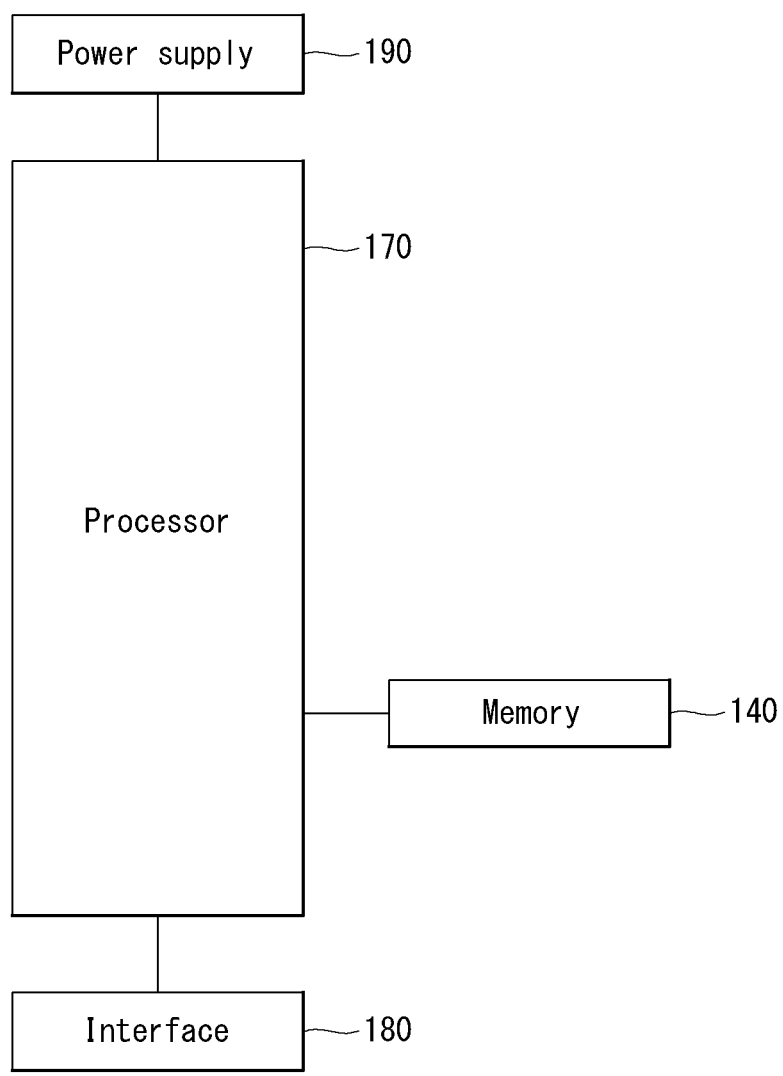
FIG. 7 is a control block diagram of an autonomous device according to an embodiment of the present disclosure.

FIG. 7 is a control block diagram of the autonomous device according to an embodiment of the present disclosure.

Referring to FIG. 7, the autonomous driving device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous driving device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous driving device 260. The power supply 190 can be provided with power from a power source (e.g., a battery) included in the vehicle 10 and supply the power to each unit of the autonomous driving device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous driving device 260 may include at least one printed circuit board (PCB). The memory 140, the interface 180, the power supply 190 and the processor 170 may be electrically connected to the PCB.

(4) Operation of Autonomous Device

Figure 8:
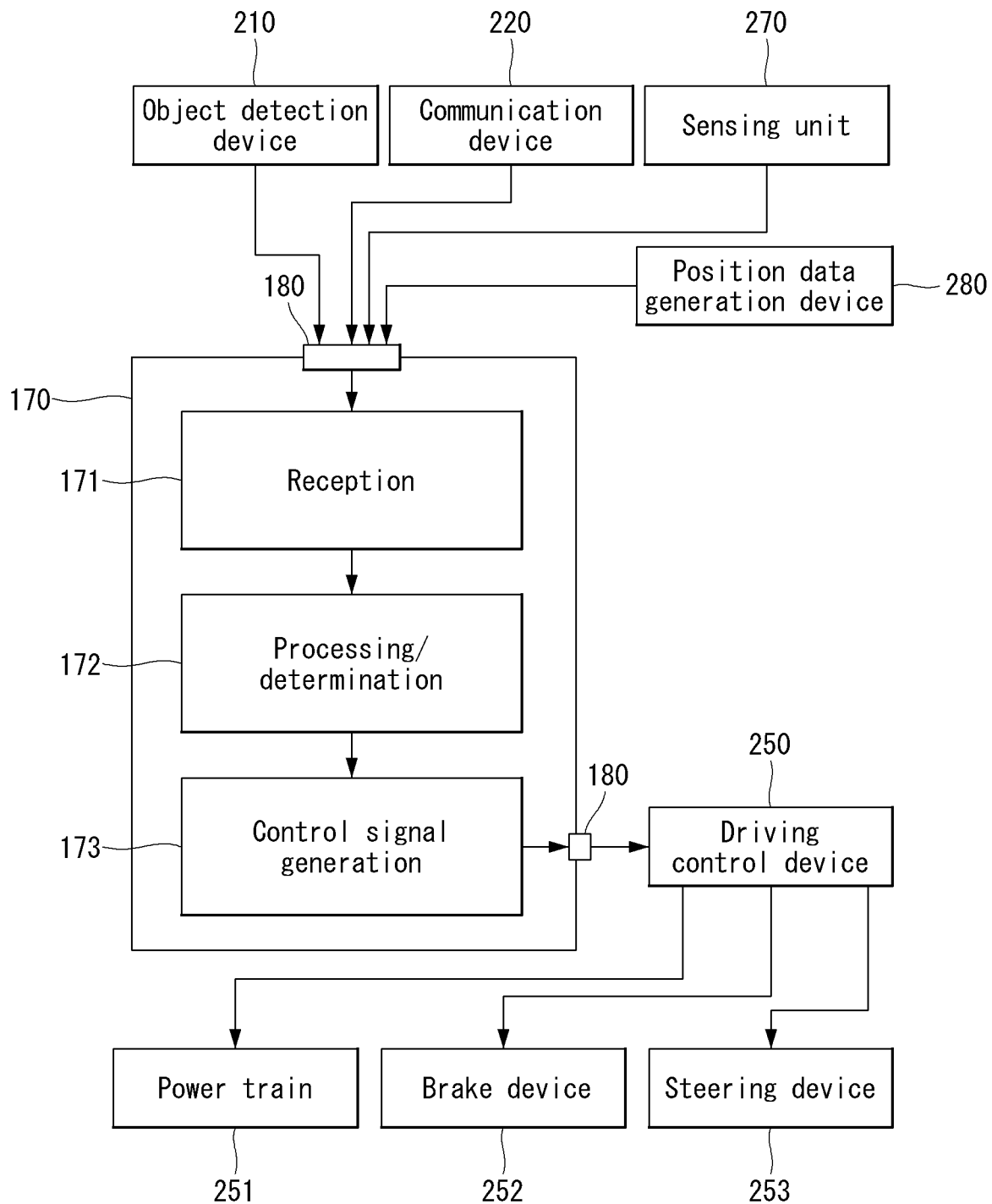
FIG. 8 is a signal flow diagram of an autonomous device according to an embodiment of the present disclosure.

FIG. 8 is a diagram showing a signal flow in an autonomous vehicle according to an embodiment of the present disclosure.

1) Reception Operation

Referring to FIG. 8, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 254.

Figure 9:
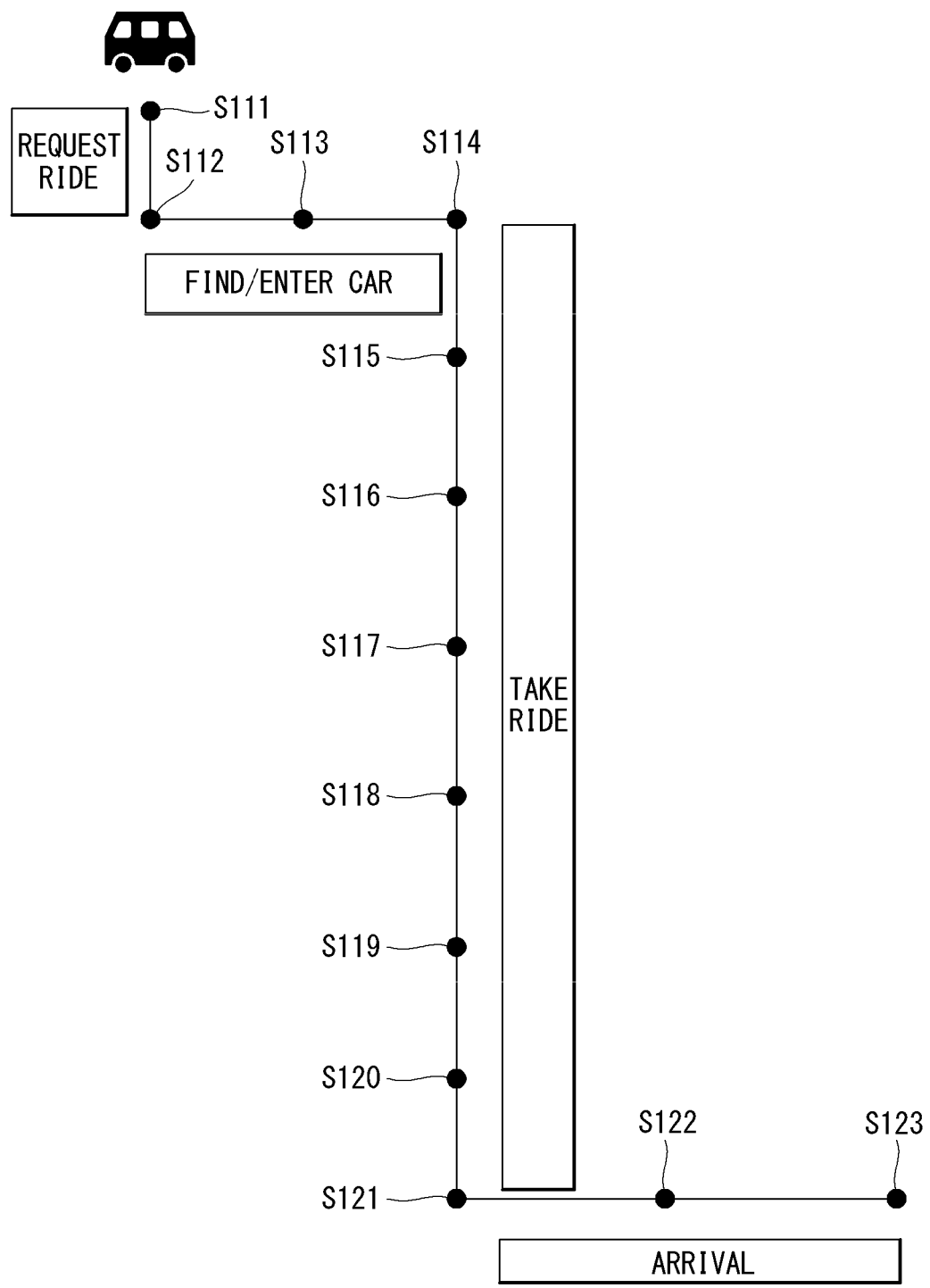
FIG. 9 is a diagram referenced to describe a use scenario of a user according to an embodiment of the present disclosure.

FIG. 9 is a diagram referenced to describe a use scenario of a user according to an embodiment of the present disclosure.

1) Destination Prediction Scenario

The autonomous vehicle may include a cabin system. Hereinafter, the cabin system can be interpreted as a traveling vehicle. A first scenario S111 is a destination prediction scenario of a user. A user terminal may install an application interoperable with the cabin system. The user terminal may predict the destination of the user based on user's contextual information using the application. The user terminal may provide vacancy information in the cabin using the application.

2) Cabin Interior Layout Preparation Scenario

A second scenario S112 is a cabin interior layout preparation scenario. The cabin system may further include a scanning device for acquiring data about a user located outside the vehicle. The scanning device may acquire user's body data and baggage data by scanning the user. The user's body data and the baggage data can be used to set the layout. The user's body data may be used to authenticate the user. The scanning device may include at least one image sensor. The image sensor may acquire a user image using light in a visible light band or an infrared band.

The cabin system may include a seat system. The seat system may set the layout in the cabin based on at least one of the user's body data and the baggage data. For example, the seat system may be provided with a luggage storage space or a car seat installation space.

3) User Welcome Scenario

3) User Welcome Scenario: A third scenario S113 is a user welcome scenario. The cabin system may further include at least one guide light. The guide light may be disposed on a floor in the cabin. The cabin system may output a guide light to allow the user to sit on a predetermined seat among a plurality of seats when the user's boarding is detected. For example, a main controller of the cabin system may implement moving lights by sequentially turning on a plurality of light sources with time from an open door to a predetermined user seat.

4) Seat Adjustment Service Scenario

A fourth scenario S114 is a seat adjustment service scenario. The seat system may adjust at least one element of the seats that match the user based on the acquired body information.

5) Personal Content Providing Scenario

A fifth scenario S115 is a personal content providing scenario. A display system of the cabin system may receive user personal data via an input device or a communication device. The display system may provide content corresponding to the user personal data.

6) Product Providing Scenario

A sixth scenario S116 is a product providing scenario. The cabin system may further include a cargo system. The cargo system may receive user data via the input device or the communication device. The user data may include user's preference data, user's destination data, and the like. The cargo system may provide products based on the user data.

7) Payment Scenario

A seventh scenario S117 is a payment scenario. The cabin system may further include a payment system. The payment system may receive data for price calculation from at least one of the input device, the communication device, and the cargo system. The payment system may calculate a vehicle usage price of the user based on the received data. The payment system may request a payment from a user (for example, a user's mobile terminal) at a calculated price.

8) Display System Control Scenario of User

An eighth scenario S118 is a display system control scenario of a user. The input device of the cabin system may receive a user input of at least one type and convert the user input into an electrical signal. The display system may control the displayed content based on the electrical signal.

9) AI Agent Scenario

A main controller of the cabin system may include an artificial intelligence agent. The artificial intelligence agent may perform machine learning based on data acquired through the input device. The AI agent may control at least one of the display system, the cargo system, the seat system, and the payment system based on the machine-learned result.

A ninth scenario S119 is a multi-channel artificial intelligence (AI) agent scenario for a plurality of users. The artificial intelligence agent may classify user input for each of a plurality of users. The artificial intelligence agent may control at least one of the display system, the cargo system, the seat system, and the payment system based on the electrical signal into which the plurality of user individual user inputs are converted.

10) Multimedia Content Providing Scenario for a Plurality of Users

A tenth scenario S120 is a multimedia content providing scenario for a plurality of users. The display system may provide content that all users can watch together. In this case, the display system may provide the same sound to a plurality of users individually through speakers provided for each sheet. The display system may provide content that a plurality of users can watch individually. In this case, the display system may provide individual sound to a plurality of users through speakers provided for each sheet.

11) User Safety Ensuring Scenario

An eleventh scenario S121 is a user safety ensuring scenario. When acquiring object information around a vehicle that threatens a user, the main controller may control an alarm for an object around the vehicle to be output through the display system.

12) Scenario for Preventing Belonging from Being Lost

A twelfth scenario S122 is a scenario for preventing belongings of a user from being lost. The main controller may acquire data about the belongings of the user through the input device. The main controller may acquire motion data of the user through the input device. The main controller may determine whether the user leaves the belongings and gets off based on the data and the motion data about the belongings. The main controller may control an alarm for the belongings to be output through the display system.

13) Get Off Report Scenario

A thirteenth scenario S123 is a get off report scenario. The main controller may receive get off data of the user through the input device. After the user gets off, the main controller may provide a report data according to getting off to a user's mobile terminal through the communication device. The report data may include total usage fee data of a vehicle 10.

V2X (Vehicle-to-Everything)

FIG. 10 is a diagram showing an example of V2X communication to which the present disclosure can be applied.

The V2X communication refers to communication between vehicles and all entities such as vehicle-to-vehicle (V2V) which refers to communication between vehicles, vehicle to infrastructure which refers to communication between a vehicle and an eNB or a road side unit (RSU), vehicle-to-pedestrian (V2P) which refers to the communication between a vehicle and UEs carried by an individual (pedestrian, cyclist, vehicle driver, or passenger), and vehicle-to-network (V2N).

The V2X communication may have the same meaning as V2X sidelink or NR V2X or may have a broader meaning including the V2X sidelink or the NR V2X.

The V2X communication can be applied to various services such as forward collision warnings, automatic parking systems, cooperative adaptive cruise control (CACC), control loss warnings, traffic matrix warnings, traffic vulnerable safety warnings, emergency vehicle warnings, speed warning when traveling on curved roads, and traffic flow control.

The V2X communication may be provided via a PC5 interface and/or a Uu interface. In this case, in a wireless communication system supporting V2X communication, specific network entities may exist for supporting communication between the vehicle and all the entities. For example, the network entity may be a BS (eNB), a road side unit (RSU), a UE, an application server (for example, a traffic safety server), or the like.

In addition, the UE performing the V2X communication may mean not only a general handheld UE, but also a vehicle UE (vehicle UE (V-UE)), a pedestrian UE, a BS type (eNB type) RSU, or a UE type RSU, a robot including a communication module, or the like.

The V2X communication may be performed directly between the UEs or via the network entity(s). The V2X operation mode may be classified according to the method for performing V2X communication.

The V2X communication requires support of anonymity and privacy of the UE in the use of the V2X application so that operators or third parties cannot track a UE identifier within an area in which the V2X is supported.

Terms frequently used in V2X communication are defined as follows.

Road side unit (RSU): RSU is a V2X serviceable device that can perform transmission/reception to/from a mobile vehicle using V2I service. In addition, the RSU is a fixed infrastructure entity that supports V2X applications and can exchange messages with other entities that support V2X applications. The RSU is a term frequently used in the existing ITS specification, and the reason for introducing the term in the 3GPP specification is to make the document easier to read in the ITS industry. The RSU is a logical entity that combines V2X application logic with the functionality of a BS (called a BS-type RSU) or a UE (called a UE-type RSU).

V2I service: A type of V2X service in which one is a vehicle and the other is an infrastructure.

V2P service: A type of V2X service in which one is a vehicle and the other is a device carried by an individual (for example, a portable UE device carried by a pedestrian, a cyclist, a driver or a passenger).

V2X service: A 3GPP communication service type associated with transmitting or receiving devices in a vehicle.

V2X enabled UE: UE supporting V2X service.

V2V service: A type of V2X service, in which both communicating objects are vehicles.

V2V communication range: Direct communication range between two vehicles participating in the V2V service.

As described above, the V2X application called vehicle-to-everything (V2X) are four types of (1) vehicle-to-vehicle (V2V), (2) vehicle-to-infrastructure (V2I), (3) vehicle-to-network (V2N), and (4) vehicle-to-pedestrian (V2P).

FIGS. 11A and 11B are diagrams showing a resource allocation method in sidelink in which the V2X is used.

In the sidelink, as shown in FIG. 11A, different physical sidelink control channels (PSCCHs) may be spaced from each other and allocated in the frequency domain, and different physical sidelink shared channels (PSSCHs) may be spaced apart from each other and allocated. Alternatively, as shown in FIG. 11B, different PSCCHs may be continuously allocated in the frequency domain, and the PSSCHs may also be continuously allocated in the frequency domain.

NR V2X

The support for V2V and V2X services in LTE is introduced to extend the 3GPP platform to the automotive industry during 3GPP releases 14 and 15.

Requirements for supporting the enhanced V2X use case are largely grouped into four use case groups.

(1) Vehicle Plating allows vehicles may dynamically form a platoon in which vehicles move together. All the vehicles in the platoon obtain information from a leading vehicle to manage the platoon. This information enables vehicles to drive more harmoniously than normal, go in the same direction and drive together.

(2) Extended sensors may exchange raw or processed data, which are collected via local sensors or live video images, in vehicles, road site units, pedestrian devices, and V2X application servers. Vehicles can increase their environmental awareness more than their sensors can detect. High data rate is one of the main features.

(3) Advanced driving enables semi-automatic or fully-automatic driving. Each vehicle and/or RSU may share its own awareness data obtained from the local sensors with proximity vehicles, and synchronize and coordinate trajectory or maneuver. Each vehicle shares a proximity driving vehicle and a driving intent.

(4) Remote driving enables a remote driver or a V2X application to drive a remote vehicle for passengers who are unable to travel on their own or in a remote vehicle in a hazardous environment. If fluctuations are limited and a route can be predicted as in public transportation, driving based on cloud computing may be used. High reliability and low latency are key requirements.

The 5G communication technology described above may be applied in combination with the methods proposed in the present disclosure to be described later, or may be supplemented to specify or clarify the technical features of the methods proposed in the present disclosure.

Hereinafter, the lidar system according to the embodiment of the present disclosure and an autonomous driving system using the same will be described in detail. In the lidar system according to the present disclosure, at least one of an autonomous vehicle, an AI device, and an external device may be linked with an artificial intelligence module, a drone (unmanned aerial vehicle (UAV)), a robot, an augmented reality (AR) device, a virtual reality (VR) device, devices related to 5G network, and the like. In the following, an embodiment is described based on an example where the lidar system is applied to an autonomous vehicle, but it should be noted that the present disclosure is not limited thereto.

An object detection device 210 may include a lidar system as shown in FIGS. 12 to 20.

Figure 12:
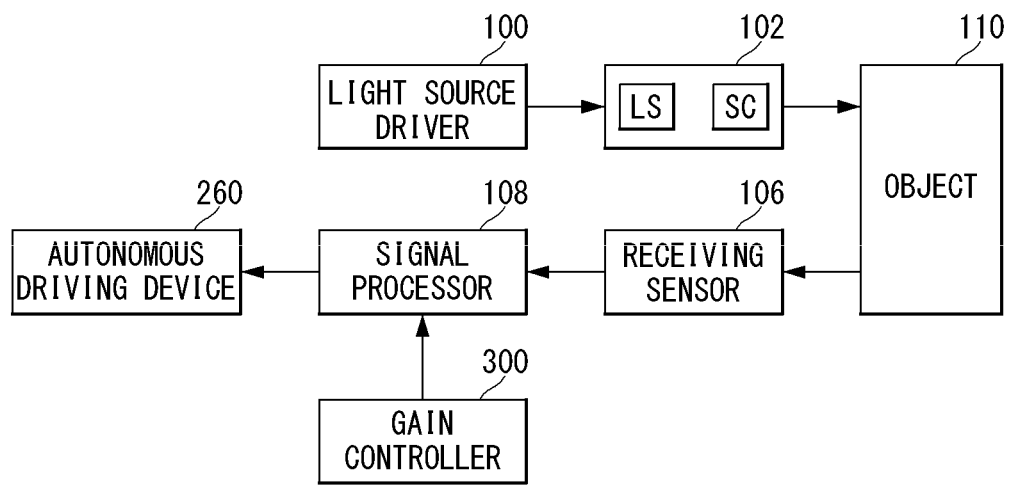
FIG. 12 is a block diagram showing a lidar system according to an embodiment of the present disclosure.
Figure 13:
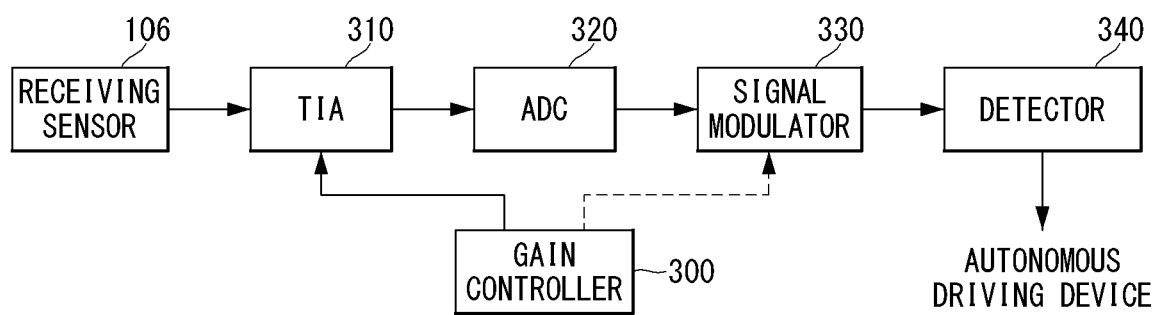
FIG. 13 is a block diagram showing in detail a signal processor.

FIG. 12 is a block diagram showing a lidar system according to an embodiment of the present disclosure. FIG. 13 is a block diagram showing in detail a signal processor.

Referring to FIGS. 12 and 13, the lidar system includes a light source driver 100, a light emitter 102, a receiving sensor 106, a signal processor 108, and a gain controller 300.

The light emitter 102 may include one or more light sources LS and a light scanner SC.

The light source driver 100 supplies a current to the laser light source LS of the light emitter 102 to drive the light source LS. The light source LS generates a laser beam in the form of a line light source or a point light source. The light source driver 100 may vary optical power by adjusting a driving current of each of the light sources LS according to traveling environment information on a traveling path received through a network. The traveling environment information may include terrain information, traffic congestion information, weather, and the like of a traveling section.

A wavelength of a laser beam generated from the light source LS may be 905 nm or 1550 nm. The 905 nm laser light source may be implemented as an InGaAs/GaAs semiconductor diode laser, and may emit high power laser light. The peak power of an InGaAs/GaAs-based semiconductor diode laser is 25 W at one emitter. In order to increase the output of the InGaAs/GaAs-based semiconductor diode laser, three emitters may be combined into a stack structure to output 75 W laser light. The InGaAs/GaAs-based semiconductor diode laser can be implemented in a small size and at low cost. A driving mode of the InGaAs/GaAs-based semiconductor diode laser is a spatial mode and a multi mode.

A 1550 nm laser light source may be implemented as a fiber laser, a diode pumped solid state (DPSS) laser, a semiconductor diode laser, or the like. An example of a fiber laser is an erbium-doped fiber laser. The 1550 nm fiber laser can emit a1550 nm laser through the erbium-doped fiber using a 980 nm diode Laser as pump laser. The peak power of the 1550 nm fiber laser can be up to several kW. The operating mode of the 1550 nm fiber laser is a spatial mode, a few mode. The 1550 nm fiber laser has a high optical quality and a small aperture size to detect an object with high resolution. The DPSS laser can emit 1534 nm laser light through laser crystal such as MgAlO and YVO using a 980 nm diode laser as a pump laser. The 1550 nm semiconductor diode laser can be implemented as an InGaAsP/InP-based semiconductor diode laser, and the peak power thereof is several tens of W. The size of the 1550 nm semiconductor diode laser is smaller than that of the fiber laser.

The laser beam generated from the light source LS is incident on the light scanner SC. The light scanner SC reciprocates the laser beam from the light source LS to implement a preset field of view (FOV). The optical scanner SC may be implemented as a two-dimensional (2D) scanner for reciprocating the laser beam within a predetermined rotation angle range in each of the horizontal direction (x axis) and the vertical direction (y axis), or two one-dimensional (1D) scanners pivoting in a direction orthogonal to each other. The scanner may be implemented as a galvano scanner or a micro electro mechanical systems (MEMS) scanner.

Figure 14:
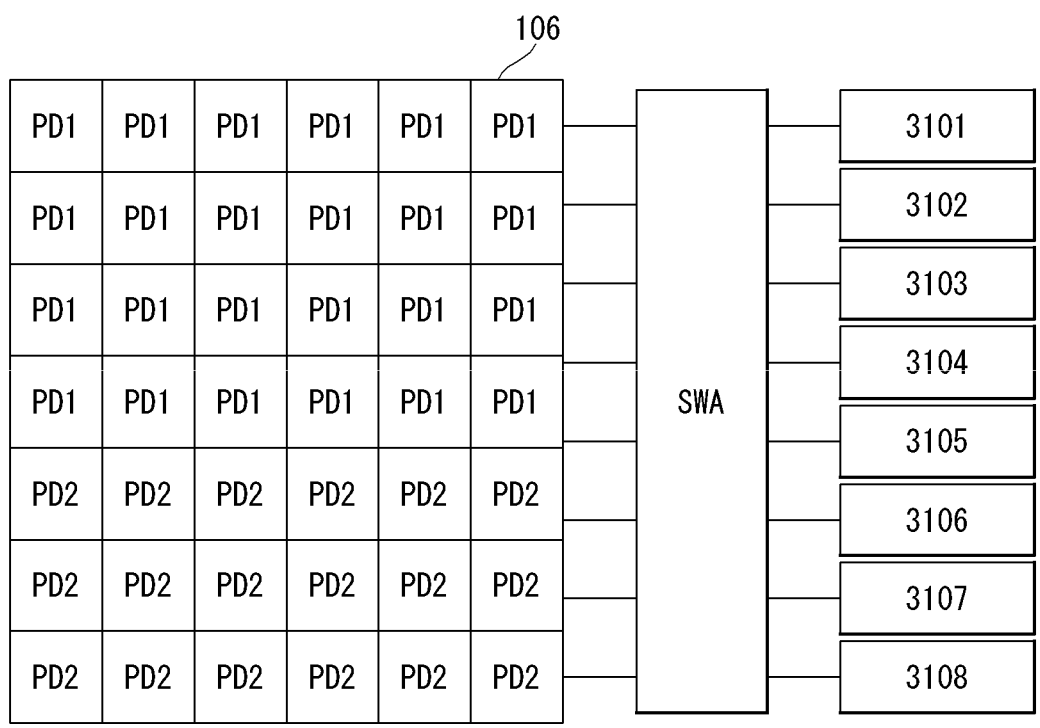
FIGS. 14 and 15 are diagrams showing in detail a receiving sensor and a switch array of a gain controller.

The laser beam emitted from the light emitter 102 is reflected on the object 110 and received by the receiving sensor 106. The receiving sensor 106 may be constituted by a plurality of optical sensors. The optical sensors use a photo-diode to convert received light into an electrical signal. The optical sensors are arranged in a matrix type as shown in FIG. 14 to convert light received from the object 110 scanned in the horizontal direction (x axis) and the vertical direction (y axis) into current.

The signal processor 108 converts the output of the receiving sensor 106 into a voltage, amplifies the signal, and then converts the amplified signal into a digital signal using an analog to digital converter (ADC). The signal processor 108 analyzes digital data input from the ADC using a time of flight (TOF) algorithm or a phase-shift algorithm to detect a distance from the object 110, a shape of the object 110, and the like.

As shown in FIG. 13, the signal processor 108 includes a trans impedance amplifier (TIA) 310 which converts the current input from the receiving sensor 106 into a voltage and amplifies the voltage, and ADC 320 which converts the output signal of the trans impedance amplifier into a digital signal, a signal modulator 330 which modulates the digital signal output from the ADC 320 into a predetermined gain, a detector which analyzes the output data of the signal modulator 330 by a TOF or phase shift algorithm to detect a distance, a shape, and the like of the object 110, a gain controller 300 which controls one or more gains of the trans impedance amplifier 310 and the signal modulator 330, and the like.

The trans impedance amplifier 310 may include a plurality of amplifiers having different gains. The trans impedance amplifier 310 amplifies the output of the receiving sensor 106 with the gain selected by the gain controller 300. In another embodiment, the gain of the trans impedance amplifier 310 may be variable to programmable gain. In this case, the gain of the trans impedance amplifier 310 may be changed according to a value input from any one of the gain controller 300, the autonomous vehicle 260, and an external device connected to the network through I2C communication.

The signal modulator 330 may modulate the data from the optical sensor by adding or multiplying the digital signal output from the ADC 320, that is, the data from the optical sensor by or to the gain value received from the gain controller 300.

The signal modulator 330 may be omitted. For example, the signal modulator 330 may be omitted if various use cases may be satisfied only by adjusting the gain of the trans impedance amplifier 310 and the short distance detection performance and the long distance detection performance are sufficient.

The gain controller 300 may vary one or more gains of the trans impedance amplifier 310 and the signal modulator 330 depending on the detected distance. The gain controller 300 may vary one or more gains of the trans impedance amplifier 310 and the signal modulator 330 according to the speed of the vehicle 10 and traveling environment.

The gain controller 300 may receive vehicle speed information and road surface information through a main ECU 240 or a network. The gain controller 300 may receive the traveling environment information through the network. The traveling environment information may include terrain information, traffic congestion information, weather, and the like of a traveling section. The gain controller 300 may adjust one or more gains of the trans impedance amplifier 310 and the signal modulator 330 based on one or more of the speed of the vehicle, the road surface condition of the road on which the vehicle travels, and the traveling environment information.

The gain controller 300 may vary one or more gains of the trans impedance amplifier 310 and the signal modulator 330 according to the mounted position of the lidar system in the vehicle.

The signal processor 108 may provide sensor data including the distance from the object and shape information to the autonomous vehicle 260. The autonomous vehicle 260 receives the sensor data received from the lidar system and reflects the detected object information to the movement control of the vehicle.

Figure 15:
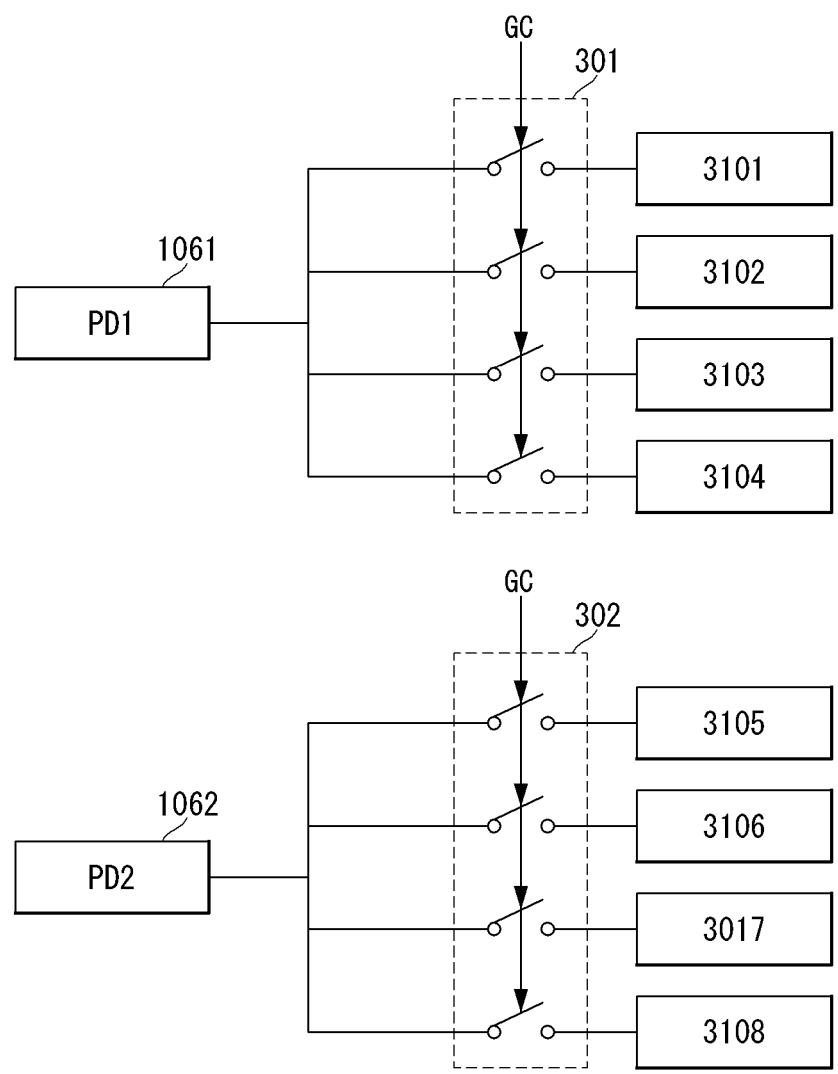

FIGS. 14 and 15 show in detail the receiving sensor 106 and a switch array SWA of the gain controller 300.

Referring to FIGS. 14 and 15, the receiving sensor 106 includes a plurality of optical sensors that sequentially receive light along a scanning direction of light in synchronization with a laser beam moving in a vertical and horizontal direction by a scanner. The optical sensors may be arranged in a matrix type.

The optical sensors of the receiving sensor 106 may be divided into long distance detection sensors and short distance detection sensors. For example, the receiving sensor 106 may include a long distance sensor PD1 for receiving light from the long distance object 110 and a short distance sensor PD2 for receiving light from the long distance object 110.

Figure 22:
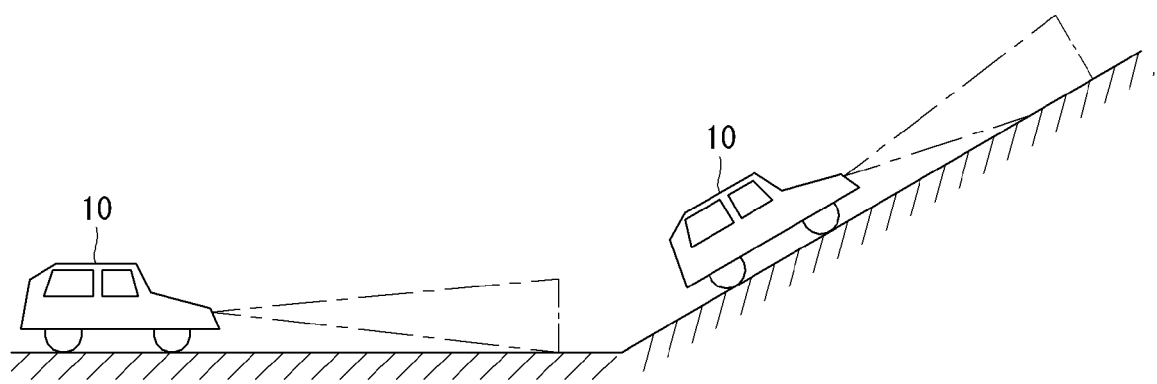
FIGS. 22 to 24 are diagrams showing an example in which a boundary and a sensor ratio of a short distance sensor and a long distance sensor vary in real time according to a traveling environment.
Figure 23:
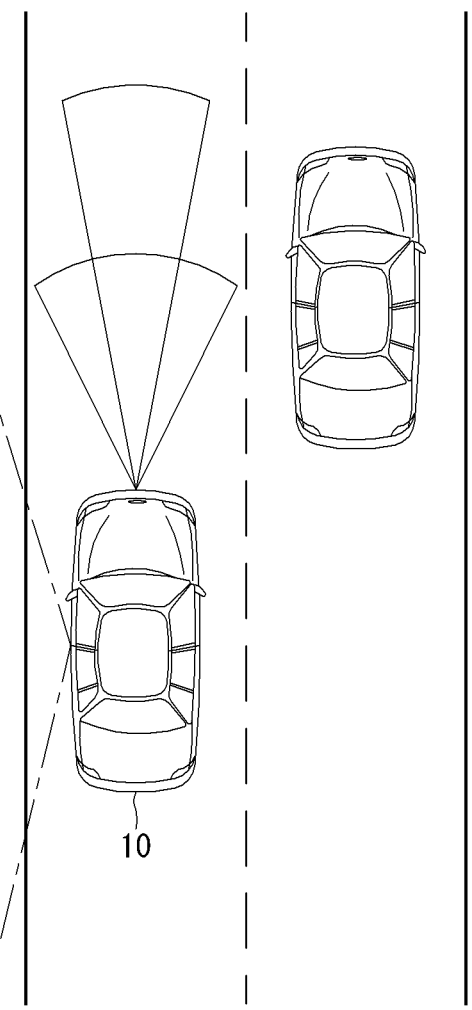
Figure 24:
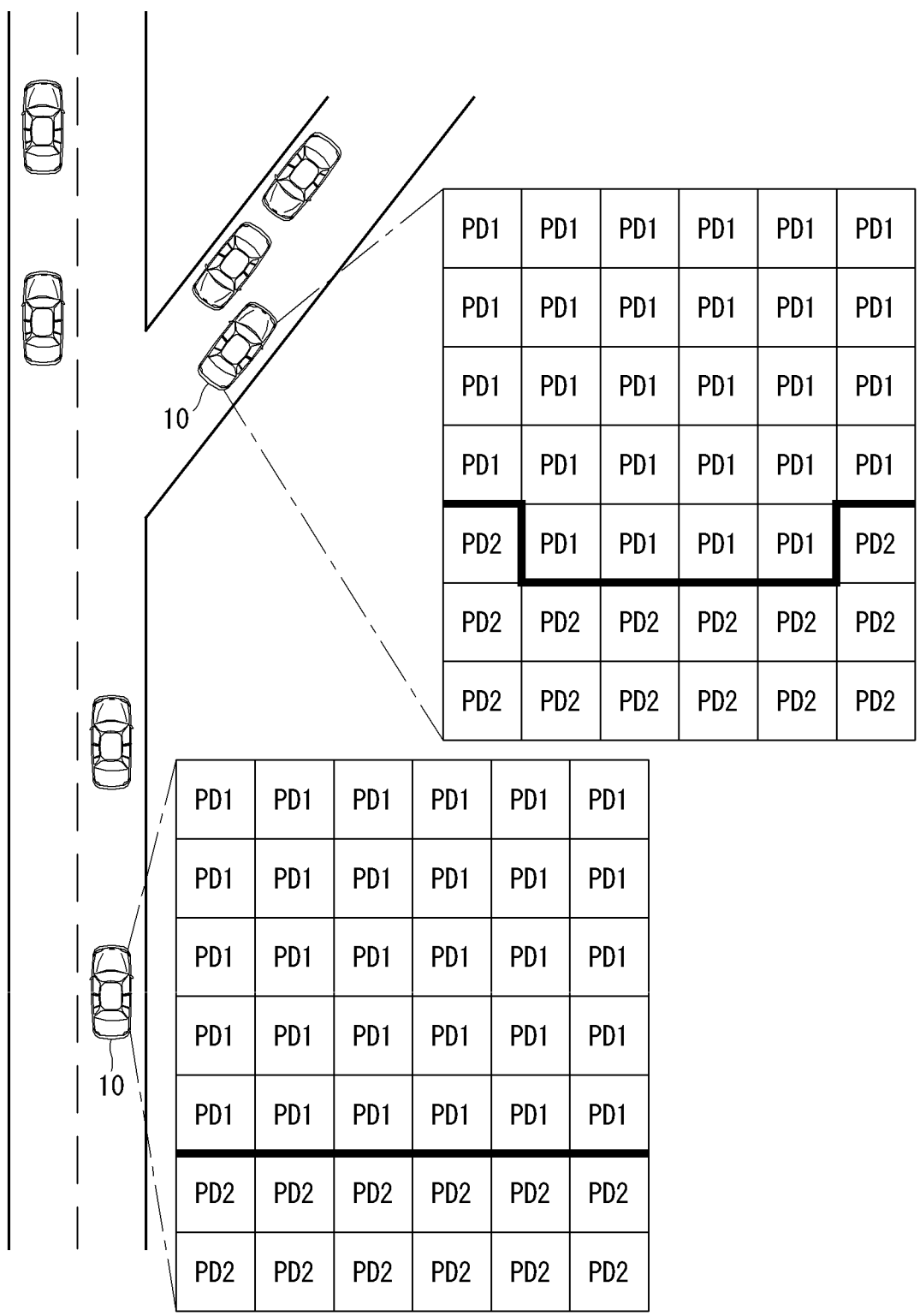

The boundary and the sensor ratio between the short distance sensor PD2 and the long distance sensor PD1 may be changed in real time according to the traveling environment as shown in FIGS. 22 to 24.

The lidar system may be disposed at one or more of the front, side, and rear of the vehicle 10. When the lidar system is disposed in front of the vehicle 10, the short distance may be 20 m to 50 m in front of the vehicle 10. The long distance may be 50 m to 100 m in front of the vehicle 10. The short distance and long distance concepts can vary depending on the mounted position of the lidar system, vehicle characteristics, traveling environment, and the like. The intermediate distance concept may be included between the short distance and the long distance.

The trans impedance amplifier 310 may include a plurality of trans impedance amplifiers 3101 to 3108 having different gains. The trans impedance amplifiers 3101 to 3108 may be divided into trans impedance amplifiers 3101 to 3104 for long distance detection and trans impedance amplifiers 3105 to 3108 for a short distance detection. Due to the high reflectance of light in the long distance, the gain of the trans impedance amplifiers 3105 to 3108 for short distance detection may be set lower than the gain of the trans impedance amplifiers 3101 to 3104 for long distance detection in consideration of the saturation problem of the short distance detection signal. For example, the maximum gain values of the trans impedance amplifiers 3105 to 3108 for short distance detection may be lower than the maximum gain values of the trans impedance amplifiers 3101 to 3014 for long distance detection.

The first to fourth trans impedance amplifiers 3101 to 3104 amplify the signals of the long distance detection sensors including the first light source PD1 by their gain. The gain of the first trans impedance amplifier 3101 may be set to be 8 to 10, the gain of the second trans impedance amplifier 3102 may be set to be 6 to 8, the gain of the third trans impedance amplifier 3103 is 4 to 6, and the gain of the second trans impedance amplifier 3104 may be set to 2 to 4, but is not limited thereto.

The fifth to eight trans impedance amplifiers 3105 to 3108 amplify the signals of the short distance detection sensors including the second light source PD2 by their gain. The gain of the fifth trans impedance amplifier 3105 may be set to be 6 to 8, the gain of the sixth trans impedance amplifier 3106 may be set to be 4 to 6, the gain of the seventh trans impedance amplifier 3107 is 2 to 4, and the gain of the eighth trans impedance amplifier 3108 may be set to 1 to 2, but is not limited thereto.

The switch array SWA includes a plurality of switch elements disposed between output nodes of the sensor array 106 and input nodes of the trans impedance amplifiers 3101-3108. Each of the switch elements is turned on/off according to a control signal from the gain controller 300.

The gain controller 300 may control the switch array SWA to adjust gains of each of the short distance sensor and the long distance sensor, respectively. In addition, the gain controller 300 may control the switch array SWA to determine the boundary between the short distance sensor and the long distance sensor, the ratio of the short distance sensor and the long distance sensor in the receiving sensor 106, and the like depending on the speed of the vehicle, the road surface condition, the traveling environment, and the like.

The switch array SWA connects the optical sensors PD1 and PD2 of the sensor array 106 to the trans impedance amplifiers 3101 to 3018 having the selected gains under the control of the gain controller 300. Each of the switch elements of the switch array SWA connects each of the optical sensors PD1 and PD2 to the trans impedance amplifier indicated by the gain controller 300 in response to a control signal GC from the gain controller 300.

The present disclosure may satisfy various use cases by adjusting the gain of the trans impedance amplifier, and may also solve the signal saturation problem in the short distance and improve the detection capability in the short and long distances.

Figure 16:
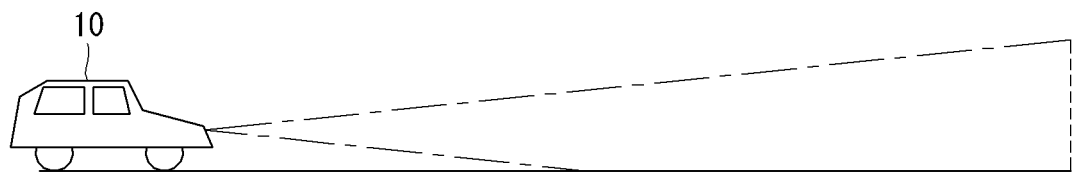
FIG. 16 is a diagram showing an example in which a lidar system is mounted on a front bumper of a vehicle.
Figure 17:
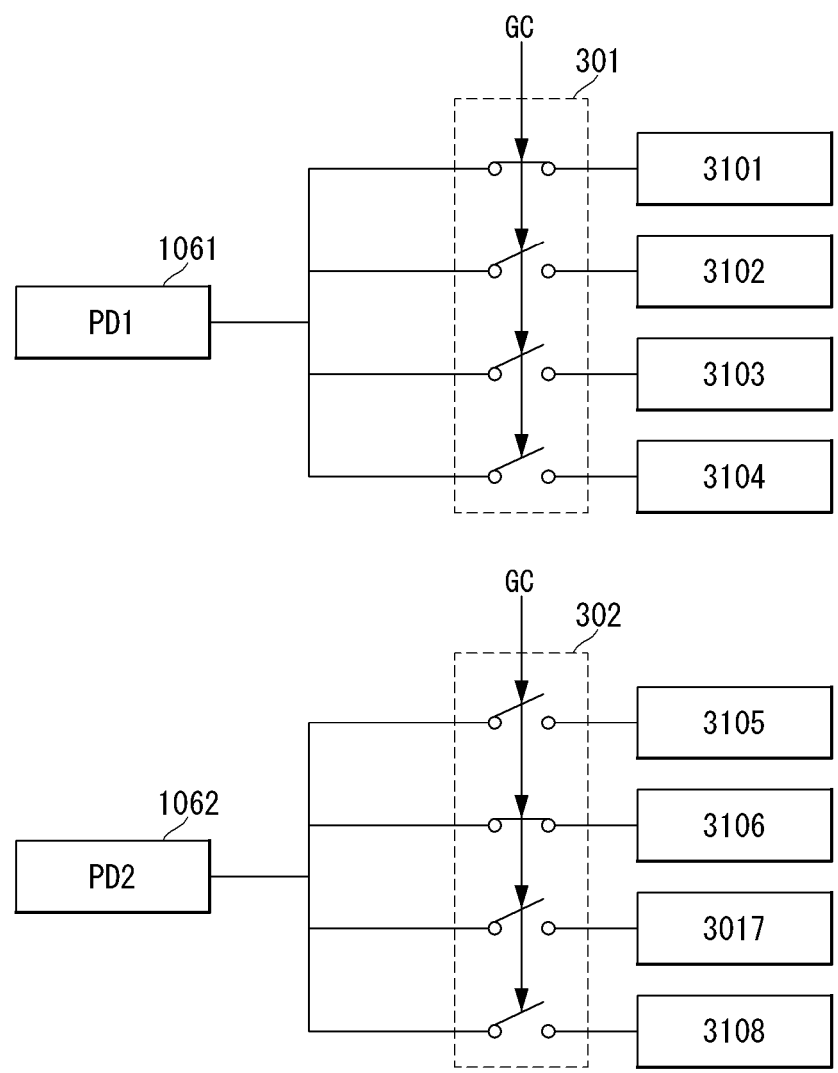
FIG. 17 is a diagram showing an example of a method for describing a gain of a trans impedance amplifier at the mounted position of the lidar system as shown in FIG. 16.

FIG. 16 is a diagram showing an example in which a lidar system is mounted on a front bumper of a vehicle. FIG. 17 is a diagram showing an example of a method for describing a gain of a trans impedance amplifier at the mounted position of the lidar system as shown in FIG. 16.

Referring to FIGS. 16 and 17, when the lidar system is mounted on the front bumper of the vehicle 10, a floor detection distance of the short distance may be far and thus the intensity of light received from the short distance may be lowered. To compensate for this, the gain controller 300 may connect the gain of the short distance sensor PD2 to the sixth trans impedance amplifier 3016 having a gain greater than or equal to a median value. The long distance sensor PD1 may be connected to a trans impedance amplifier having a gain suitable for the long distance detection among the first to fourth trans impedance amplifiers 3101 to 3104 in consideration of one or more of the speed of the vehicle, the road surface condition, and the traveling environment.

The gain controller 300 may increase the gain of the sensor data output from the short distance detection sensor in the signal modulator 330 when the lidar system is mounted on the front bumper of the vehicle. For example, the gain controller 300 may control the gain applied to the output data of the ADC 320 obtained from the short distance sensor PD2 to be a gain greater than or equal to the median value.

When the lidar system is mounted on the front bumper of the vehicle 10, the intensity of light received by the receiving sensor 106 increases at the short distance at which the reflectance is high. In this case, the gain of the output signal of the second optical sensor PD2 is set to be a low value by lowering the boundary between the short distance sensor and the long distance sensor and lowering the ratio of the short distance sensor at the receiving sensor 106, thereby improving the problem of the signal saturation.

Figure 18:
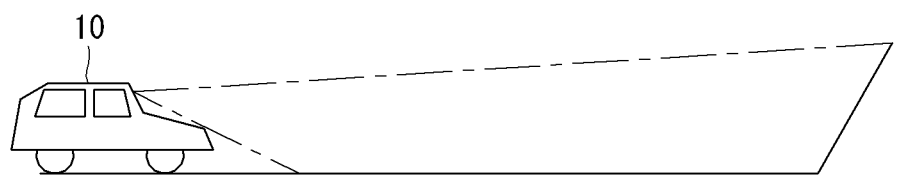
FIG. 18 is a diagram showing an example in which the lidar system is mounted on a front windshield of a vehicle.
Figure 19:
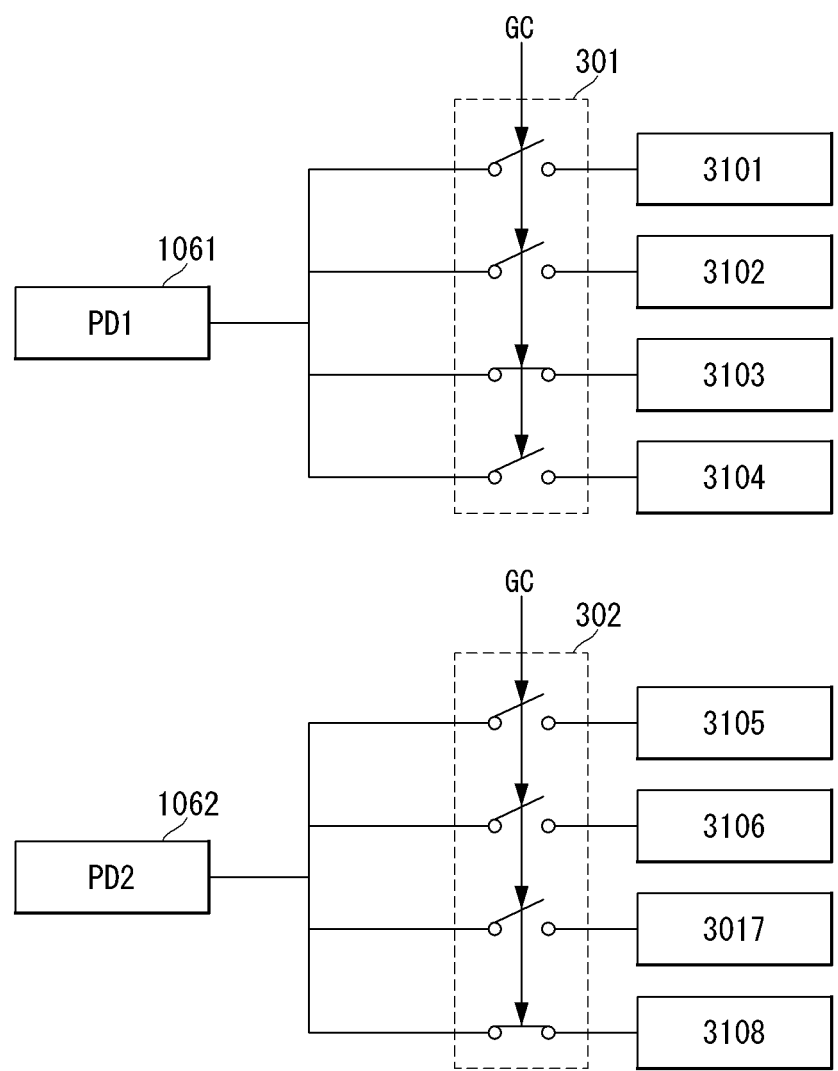
FIG. 19 is a diagram showing an example of a method for describing a gain of a trans impedance amplifier at the mounted position of the lidar system as shown in FIG. 18.

FIG. 18 is a diagram showing an example in which the lidar system is mounted on a front windshield of a vehicle. FIG. 19 is a diagram showing an example of a method for describing a gain of a trans impedance amplifier at the mounted position of the lidar system as shown in FIG. 18.

Referring to FIGS. 18 and 19, the lidar system may be mounted on the front windshield located at the top of the vehicle 10. In this case, if the floor detection distance of the short distance is near and thus the reflectance of light is high and the gain of the trans impedance amplifier is high, the signal may be saturated, such that the short distance object may not be detected. To compensate for this, the gain controller 300 may connect the gain of the short distance sensor PD2 to the eighth trans impedance amplifier 3018 having a gain lower than a median value. The first optical sensor PD2 may be connected to a trans impedance amplifier having a gain suitable for the long distance detection among the first to fourth trans impedance amplifiers 3101 to 3104 in consideration of one or more of the speed of the vehicle, the road surface condition, and the traveling environment. Therefore, the present disclosure can accurately detect the short distance object without signal saturation when detecting the short distance object by applying the same laser power without differentiating power of a light source for short distance detection and power of a light source for long distance detection.

The gain controller 300 may lower the gain of the sensor data output from the short distance detection sensor in the signal modulator 330 when the lidar system is mounted on the front windshield of the vehicle. For example, the gain controller 300 may control the gain applied to the output data of the ADC 320 obtained from the short distance sensor PD2 to be a gain lower than to the median value.

When the lidar system is mounted on the top of the vehicle 10, the reflectance of light may be lowered near the lidar. In this case, the gain of the short distance sensor can be set relatively high by increasing the boundary between the short distance sensor and the long distance sensor and increasing the ratio of the short distance sensor in the receiving sensor 106.

Figure 20:
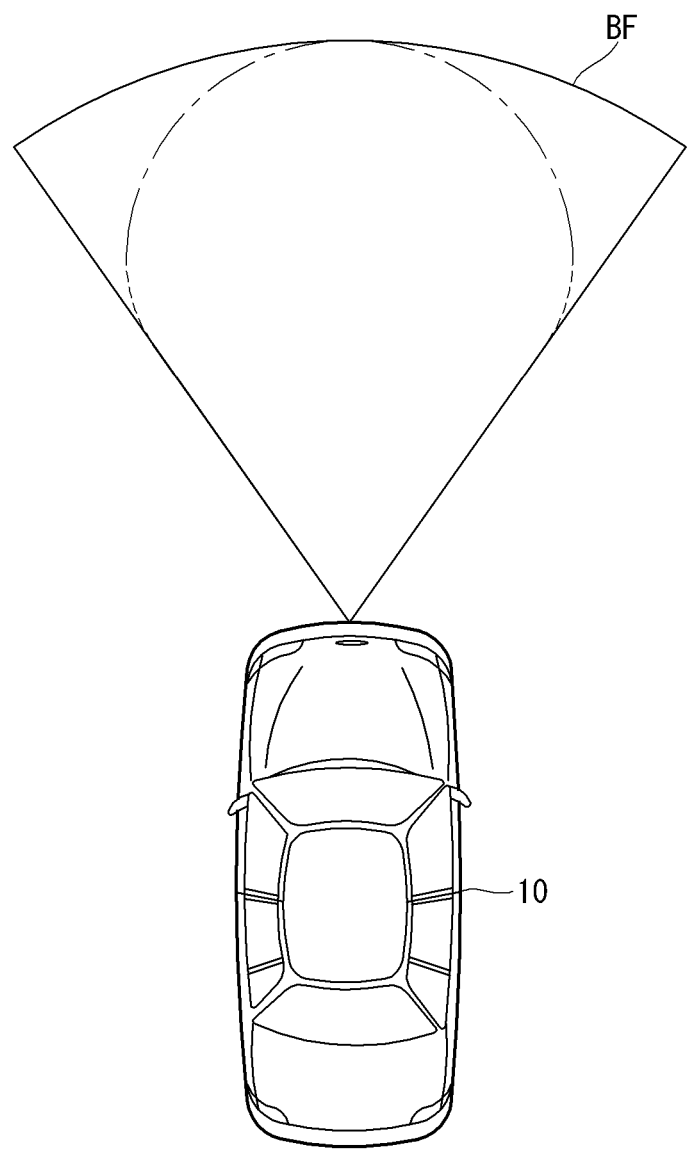
FIG. 20 is a diagram showing an effect of increasing a detection distance at both edges of a horizontal scan direction by a method for adjusting a gain of a trans impedance amplifier.

FIG. 20 is a diagram showing an effect of increasing a detection distance at both edges of a horizontal scan direction by a method for adjusting a gain of a trans impedance amplifier.

Referring to FIG. 20, the beam forming (BF) of the laser beam emitted from the light emitter 102 has a non-uniform characteristic with a relatively lower light intensity at both edges as compared to the center part. The gain controller 300 may compensate for the non-uniformity of light intensity due to the non-uniformity of the beam forming by increasing the amplifier gain of the optical sensor signal through which light at both edges of the laser beam is received. As a result, the present disclosure can adjust the gain of the trans impedance amplifier 310 or the signal modulator 330 to increase the beam forming without increasing the optical power of the laser beam and without using a beam expander.

Figure 21:
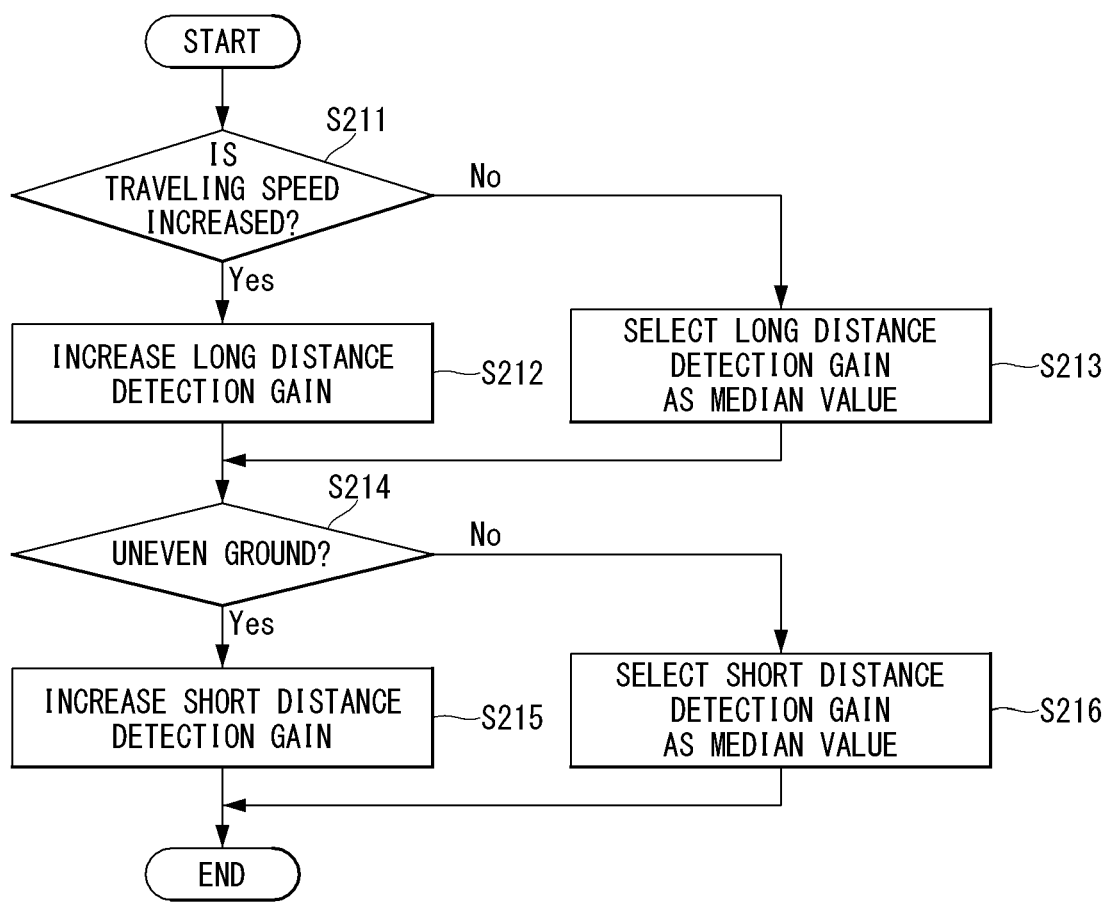
FIG. 21 is a flowchart showing an example of a gain control method for varying a gain of a trans impedance amplifier in real time according to a traveling speed of a vehicle and a road surface condition.

FIG. 21 is a flowchart showing an example of a gain control method for varying a gain of a trans impedance amplifier in real time according to a traveling speed of a vehicle and a road surface condition.

Referring to FIG. 21, when the traveling speed of the vehicle increases, the gain controller 300 may increase the long distance detection gain of at least one of the trans impedance amplifier 310 and the signal modulator 330 (S211 and S212). When the traveling speed of the vehicle decreases, the gain controller 300 may adjust the long distance detection gain of at least one of the trans impedance amplifier 310 and the signal modulator 330 to be lower than or equal to the median value (S211 and S213).

The gain controller 300 may increase one or more short distance detection gains of the trans impedance amplifier 310 and the signal modulator 330 when the vehicle is traveling on uneven ground or dirt roads (S214 and S215). The gain controller 300 may adjust one or more short distance detection gains of the trans impedance amplifier 310 and the signal modulator 330 to be lower than or equal to a median value when the vehicle is traveling on flat ground or pavement roads (S214 and S216).

FIGS. 22 to 24 are diagrams showing examples in which positions of the first optical sensor and the second optical sensor are changed in real time according to the traveling environment.

As shown in FIG. 22, the distance between the lidar system and the short distance may be narrowed when the vehicle 10 goes up or down a hill. In this case, the gain controller 400 may lower the boundary between the short distance sensor PD2 and the long distance sensor PD1 and lower the ratio of the short distance sensor PD1 in the receiving sensor 106. In addition, the gain controller 400 may lower the signal gain of the short distance sensor PD2 when the vehicle 10 goes up or down a hill.

As shown in FIG. 23, when another vehicle approaches the right side of the traveling vehicle 10, an area of the short distance sensor PD2 may be enlarged to the right side in the receiving sensor 106. The gain controller 400 may raise a right boundary between the short distance sensor PD2 and the long distance sensor PD1 and increase the ratio of the short distance sensor in the receiving sensor 106.

As shown in FIG. 24, when the vehicle 10 enters an alley, the vehicle 10 may travel along a narrow road between another parked vehicle and an obstacle. In this case, the gain controller 400 may raise the boundary between the short distance sensor PD2 and the long distance sensor PD1 at left and right sides in the receiving sensor 106 and increase the ratio of the short distance sensor in the receiving sensor 106. Various embodiments of the lidar system of the present disclosure will be described below.

First Embodiment

The lidar system includes: a light emitter configured to include a light source generating a laser beam and a scanner moving the laser beam from the light source to scan an object with the laser beam; a receiving sensor configured to convert light reflected and received by the object into an electrical signal; and a signal processor configured to include a trans impedance amplifier amplifying an output signal of the receiving sensor, an analog to digital converter converting an output signal of the trans impedance amplifier into a digital signal, and a gain controller varying a gain of the trans impedance amplifier.

The gain controller may adjust the gain of the trans impedance amplifier depending on a detection distance of the lidar system.

Second Embodiment

The gain controller may adjust the gain of the trans impedance amplifier based on one or more of a speed of a vehicle, a road surface condition of a road on which the vehicle travels, and traveling environment information received from a network.

Third Embodiment

The receiving sensor may include: a first optical sensor configured to receive light from a long distance object; and a second optical sensor configured to receive light from a short distance object.

Fourth Embodiment

The trans impedance amplifier may include: a plurality of trans impedance amplifiers for long distance detection configured to have differently set gain values to amplify an output signal of the first optical sensor; and a plurality of trans impedance amplifiers for short distance detection configured to have differently set gain values to amplify an output signal of the second optical sensor.

Fifth Embodiment

The gain controller may include a switch array configured to be disposed between the long distance sensor and the short distance sensors and the trans impedance amplifiers.

The switch array may connect the first optical sensor to any one of the trans impedance amplifiers for long distance detection under a control of the gain controller, and connect the second optical sensor to any one of the trans impedance amplifiers for short distance detection under the control of the gain controller.

Sixth Embodiment

A maximum gain value of the trans impedance amplifiers for short distance detection may be lower than that of the trans impedance amplifiers for long distance detection.

Seventh Embodiment

When the lidar system is mounted on a front bumper of the vehicle, the second optical sensor may be connected to a trans impedance amplifier having a gain lower than the median value among the trans impedance amplifiers for short distance detection.

Eighth Embodiment

When the lidar system is mounted on the front bumper of the vehicle, the second optical sensor may be connected to a trans impedance amplifier having a gain lower than the median value among the trans impedance amplifiers for short distance detection.

Ninth Embodiment

The lidar system may further include a signal modulator configured to multiply or add the gain by or to the digital signal output from the analog to digital converter to modulate the digital signal.

The gain controller may adjust a gain of the signal modulator depending on the detection distance of the lidar system.

Tenth Embodiment

When the lidar system is mounted on the front bumper of the vehicle, the gain controller controls a gain applied to output data of the analog to digital converter obtained from the second optical sensor to be a gain greater than or equal to the median value.

Eleventh Embodiment

When the lidar system is mounted on a front windshield of the vehicle, the gain controller may control the gain applied to the output data of the analog to digital converter obtained from the short distance sensor to be a gain lower than the median value.

Twelfth Embodiment

The gain controller may increase a long distance detection gain of one or more of the trans impedance amplifier and the signal modulator when the speed of the vehicle increases.

Thirteenth Embodiment

The gain controller may increase a short distance detection gain of one or more of the trans impedance amplifier and the signal modulator when the vehicle travels on an uneven ground.

Fourteenth Embodiment

The lidar system includes: a light emitter configured to include a light source generating a laser beam and a scanner moving the laser beam from the light source to scan an object with the laser beam; a receiving sensor configured to convert light reflected and received by the object into an electrical signal; and a signal processor configured to include a trans impedance amplifier amplifying an output signal of the receiving sensor, an analog to digital converter converting an output signal of the trans impedance amplifier into a digital signal, a signal modulator converting a digital signal output from the analog to digital modulator into a gain, and a gain controller varying a gain of the trans impedance amplifier.

The gain controller may adjust a gain of the signal modulator depending on the detection distance of the lidar system.

Various embodiments of the autonomous driving system of the present disclosure will be described below.

First Embodiment 1

The autonomous vehicle includes: a lidar system configured to irradiate a laser beam to an outside of a vehicle to detect an object outside the vehicle; and an autonomous driving device configured to receive sensor data received from the lidar system to reflect information on the object to movement control of the vehicle.

The lidar system includes: a light emitter configured to include a light source generating a laser beam and a scanner moving the laser beam from the light source to scan an object with the laser beam; a receiving sensor configured to convert light reflected and received by the object into an electrical signal; and a signal processor configured to include a trans impedance amplifier amplifying an output signal of the receiving sensor, an analog to digital converter converting an output signal of the trans impedance amplifier into a digital signal, and a gain controller varying a gain of the trans impedance amplifier.

The gain controller adjusts the gain of the trans impedance amplifier depending on a detection distance of the lidar system.

Second Embodiment

The gain controller may adjust the gain of the trans impedance amplifier based on one or more of a speed of a vehicle, a road surface condition of a road on which the vehicle travels, and traveling environment information received from a network.

Third Embodiment

The receiving sensor may include: a long distance sensor configured to receive light from a long distance object; and a short distance sensor configured to receive light from a short distance object.

Fourth Embodiment

The trans impedance amplifier may include: a plurality of trans impedance amplifiers for long distance detection configured to have differently set gain values to amplify an output signal of the long distance sensor; and a plurality of trans impedance amplifiers for short distance detection configured to have differently set gain values to amplify an output signal of the short distance sensor.

Fifth Embodiment

The gain controller may include a switch array configured to be disposed between the long distance sensor and the short distance sensors and the trans impedance amplifiers.

The switch array may connect the long distance sensor to any one of the trans impedance amplifiers for long distance detection under a control of the gain controller, and connect the short distance sensor to any one of the trans impedance amplifiers for short distance detection under the control of the gain controller.

Sixth Embodiment

A maximum gain value of the trans impedance amplifiers for short distance detection may be lower than that of the trans impedance amplifiers for long distance detection.

Seventh Embodiment

When the lidar system is mounted on a front bumper of the vehicle, the short distance sensor may be connected to a trans impedance amplifier having a gain lower than the median value among the trans impedance amplifiers for short distance detection.

Eighth Embodiment

When the lidar system is mounted on the front bumper of the vehicle, the short distance sensor may be connected to a trans impedance amplifier having a gain lower than the median value among the trans impedance amplifiers for short distance detection.

Ninth Embodiment

The lidar system may further include a signal modulator configured to multiply or add the gain by or to the digital signal output from the analog to digital converter to modulate the digital signal.

The gain controller may adjust a gain of the signal modulator depending on the detection distance of the lidar system.

Tenth Embodiment

When the lidar system is mounted on the front bumper of the vehicle, the gain controller controls a gain applied to output data of the analog to digital converter obtained from the short distance sensor to be a gain greater than or equal to the median value.

Eleventh Embodiment

When the lidar system is mounted on a front windshield of the vehicle, the gain controller may control the gain applied to the output data of the analog to digital converter obtained from the short distance sensor to be a gain lower than the median value.

Twelfth Embodiment

The gain controller may increase a long distance detection gain of one or more of the trans impedance amplifier and the signal modulator when the speed of the vehicle increases.

Thirteenth Embodiment

The gain controller may increase a short distance detection gain of one or more of the trans impedance amplifier and the signal modulator when the vehicle travels on an uneven ground.

Fourteenth Embodiment 14

The autonomous vehicle includes: a lidar system configured to irradiate a laser beam to an outside of a vehicle to detect an object outside the vehicle; and an autonomous driving device configured to receive sensor data received from the lidar system to reflect information on the object to movement control of the vehicle.

Fifteenth Embodiment

A boundary between the short distance sensor and the long distance sensor when the lidar system is mounted to the front windshield of the vehicle, and a boundary between the short distance sensor and the long distance sensor when the lidar system is mounted on the front bumper of the vehicle may be different.

Sixteenth Embodiment

The boundary between the short distance sensor and the long distance sensor may vary in real time according to the traveling environment of the vehicle. The lidar system may include: a light emitter configured to include a light source generating a laser beam and a scanner moving the laser beam from the light source to scan an object with the laser beam; a receiving sensor configured to convert light reflected and received by the object into an electrical signal; and a signal processor configured to include a trans impedance amplifier amplifying an output signal of the receiving sensor, an analog to digital converter converting an output signal of the trans impedance amplifier into a digital signal, a signal modulator converting a digital signal output from the analog to digital modulator into a gain, and a gain controller varying a gain of the trans impedance amplifier.

The gain controller may adjust a gain of the signal modulator depending on the detection distance of the lidar system.

The effects of the lidar system according to the embodiment of the present disclosure will be described below.

The present disclosure can satisfy various use cases by adjusting the gain of the trans impedance amplifier.

The present disclosure can accurately detect the short distance object without signal saturation when detecting the short distance object by applying the same laser power without differentiating power of a light source for short distance detection and power of a light source for long distance detection.

The present disclosure can expand the beamforming without increasing the optical power of the laser beam and using the beam expander by adjusting the gain of the trans impedance amplifier or the signal modulator to compensate for the non-uniform intensity of light due to the non-uniformity of the laser beamforming.

The present disclosure can improve the stability of the autonomous driving by varying the gain of the trans impedance amplifier or the signal amplifier in real time according to the traveling speed of the vehicle, the road surface condition, or the traveling environment.

The present disclosure can be flexibly applied to the lidar system according to various use cases such as the lidar mounting position of the vehicle and the traveling environment.

Effects which can be achieved by the present disclosure are not limited to the above-mentioned effects. That is, other objects that are not mentioned may be obviously understood by those skilled in the art to which the present disclosure pertains from the following description.

The present disclosure can be achieved as computer-readable codes on a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage, and may also be implemented in a carrier wave type (for example, transmission using the internet). Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lidar system, comprising:
a light emitter configured to include a light source generating a laser beam and a scanner moving the laser beam from the light source to scan an object with the laser beam;
a receiving sensor configured to convert light reflected and received by the object into an electrical signal; and
a signal processor including a trans impedance amplifier that is configured to amplify an output signal of the receiving sensor, an analog to digital converter that is configured to convert an output signal of the trans impedance amplifier into a digital signal, and a gain controller that is configured to vary a gain of the trans impedance amplifier,
wherein the receiving sensor includes:
a first optical sensor configured to receive light from a long distance object and
a second optical sensor configured to receive light from a short distance object,
wherein the trans impedance amplifier includes:
a plurality of trans impedance amplifiers for long distance detection configured to have differently set gain values to amplify an output signal of the first optical sensor; and
a plurality of trans impedance amplifiers for short distance detection configured to have differently set gain values to amplify an output signal of the second optical sensor,
wherein the gain controller is configured to adjust the gain of the trans impedance amplifier depending on a detection distance of the lidar system.

2. The lidar system of claim 1, wherein the gain controller is configured to adjust the gain of the trans impedance amplifier based on one or more of a speed of a vehicle, a road surface condition of a road on which the vehicle travels, or traveling environment information received from a network.

3. The lidar system of claim 1, wherein the gain controller includes a switch array configured to be disposed between the first optical sensor and the second optical sensors and the trans impedance amplifiers, and
wherein the switch array connects the first optical sensor to any one of the trans impedance amplifiers for long distance detection under a control of the gain controller, and connects the second optical sensor to any one of the trans impedance amplifiers for short distance detection under the control of the gain controller.

4. The lidar system of claim 3, wherein a maximum gain value of the trans impedance amplifiers for short distance detection is lower than that of the trans impedance amplifiers for long distance detection.

5. The lidar system of claim 4, wherein based on the lidar system being mounted on a front bumper of a vehicle, the second optical sensor is connected to a trans impedance amplifier having a gain greater than or equal to a median value among the trans impedance amplifiers for short distance detection.

6. The lidar system of claim 5, wherein based on the lidar system being mounted on a front windshield of the vehicle, the second optical sensor is connected to a trans impedance amplifier having a gain lower than the median value among the trans impedance amplifiers for short distance detection.

7. The lidar system of claim 1, further comprising:
a signal modulator configured to modulate a digital signal output from an analog-to-digital converter by multiplying or adding a gain, and
wherein the gain controller is configured to adjust the gain of the signal modulator depending on the detection distance of the lidar system.

8. The lidar system of claim 1, wherein each of the first optical sensor and the second optical sensor includes a photo-diode to convert the received light into an electrical signal.

9. The lidar system of claim 1, wherein the first optical sensor and the second optical sensor are arranged in a matrix type to convert the received light from the long distance object and the short distance object into current.

10. An autonomous vehicle, comprising:
a lidar system configured to irradiate a laser beam to an outside of a vehicle to detect an object outside the vehicle; and
an autonomous driving device configured to receive sensor data received from the lidar system to reflect information on the object to movement control of the vehicle,
wherein the lidar system includes:
a light emitter configured to include a light source generating a laser beam and a scanner moving the laser beam from the light source to scan an object with the laser beam;
a receiving sensor configured to convert light reflected and received by the object into an electrical signal; and
a signal processor including a trans impedance amplifier configured to amplify an output signal of the receiving sensor, an analog to digital converter configured to convert an output signal of the trans impedance amplifier into a digital signal, and a gain controller configured to vary a gain of the trans impedance amplifier, and
wherein the receiving sensor includes:
a first optical sensor configured to receive light from a long distance object; and
a second optical sensor configured to receive light from a short distance object,
wherein the trans impedance amplifier includes:
a plurality of trans impedance amplifiers for long distance detection configured to have differently set gain values to amplify an output signal of a first optical sensor; and
a plurality of trans impedance amplifiers for short distance detection configured to have differently set gain values to amplify an output signal of the second optical sensor, and
wherein the gain controller is configured to adjust the gain of the trans impedance amplifier depending on a detection distance of the lidar system.

11. The autonomous vehicle of claim 10, wherein the gain controller is configured to adjust the gain of the trans impedance amplifier based on one or more of a speed of a vehicle, a road surface condition of a road on which the vehicle travels, or traveling environment information received from a network.

12. The autonomous vehicle of claim 10, wherein the gain controller includes a switch array configured to be disposed between the optical sensors and the trans impedance amplifiers, and
wherein the switch array connects the first optical sensor to any one of the trans impedance amplifiers for long distance detection under a control of the gain controller, and connects the second optical sensor to any one of the trans impedance amplifiers for long distance detection under a control of the gain controller.

13. The autonomous vehicle of claim 12, wherein a maximum gain value of the trans impedance amplifiers for short distance detection is lower than that of the trans impedance amplifiers for long distance detection.

14. The autonomous vehicle of claim 10, wherein each of the first optical sensor and the second optical sensor includes a photo-diode to convert the received light into an electrical signal.

15. The autonomous vehicle of claim 10, wherein the first optical sensor and the second optical sensor are arranged in a matrix type to convert the received light from the long distance object and the short distance object into current.

16. A lidar system, comprising:
a light emitter configured to include a light source generating a laser beam and a scanner moving the laser beam from the light source to scan an object with the laser beam;
a receiving sensor configured to convert light reflected and received by the object into an electrical signal;
a signal processor including a trans impedance amplifier configured to amplify an output signal of the receiving sensor, an analog to digital converter configured to convert an output signal of the trans impedance amplifier into a digital signal, and a gain controller configured to vary a gain of the trans impedance amplifier, and
a signal modulator configured to modulate a digital signal output from an analog-to-digital converter by multiplying or adding a gain,
wherein the receiving sensor includes:
a first optical sensor configured to receive light from a long distance object; and
a second optical sensor configured to receive light from a short distance object,
wherein the gain controller is configured to adjust the gain of the trans impedance amplifier or the gain of the signal modulator depending on a detection distance of the lidar system, and
wherein, based on the lidar system being mounted on a front bumper of a vehicle, the gain controller is configured to control a gain applied to output data of the analog to digital converter obtained from the second optical sensor to be a gain greater than or equal to the median value.

17. The lidar system of claim 16, wherein based on the lidar system being mounted on a front windshield of the vehicle, the gain controller is configured to control the gain applied to the output data of the analog to digital converter obtained from the second optical sensor to be a gain lower than the median value.

18. The lidar system of claim 17, wherein the gain controller is configured to increase a long distance detection gain of one or more of the trans impedance amplifier or the signal modulator based on the speed of the vehicle increasing.

19. The lidar system of claim 18, wherein the gain controller is configured to increase a short distance detection gain of one or more of the trans impedance amplifier or the signal modulator based on the vehicle traveling on an uneven ground.

20. The lidar system of claim 16, wherein each of the first optical sensor and the second optical sensor includes a photo-diode to convert the received light into an electrical signal.

21. The lidar system of claim 16, wherein the first optical sensor and the second optical sensor are arranged in a matrix type to convert the received light from the long distance object and the short distance object into current.

* * * * *